ion(12) United States Patent
Lynn et al.

(10) Patent No.: US 8,626,845 B2
(45) Date of Patent: Jan. 7, 2014

(54) METHOD AND SYSTEM FOR DYNAMICALLY GENERATING ELECTRONIC COMMUNICATIONS

(75) Inventors: Scott Lynn, Kansas City, MO (US); Shane Brady, Stilwell, KS (US); John Linden, Kansas City, MO (US)

(73) Assignee: Adknowledge, Inc., Kansas City, MO (US)

( * ) Notice: Subject to any disclaimer, the term of this patent is extended or adjusted under 35 U.S.C. 154(b) by 78 days.

(21) Appl. No.: 12/647,749

(22) Filed: Dec. 28, 2009

(65) Prior Publication Data

US 2010/0106788 A1  Apr. 29, 2010

Related U.S. Application Data

(63) Continuation of application No. 10/915,975, filed on Aug. 11, 2004.

(60) Provisional application No. 60/495,027, filed on Aug. 14, 2003.

(51) Int. Cl.
  *G06F 15/16* (2006.01)
  *G06Q 10/00* (2012.01)

(52) U.S. Cl.
  USPC ....... 709/206; 709/203; 705/14.51; 705/14.4; 705/14.39; 705/14.49

(58) Field of Classification Search
  USPC ........... 709/203, 206; 705/14.51, 14.4, 14.39, 705/14.49
  See application file for complete search history.

(56) References Cited

U.S. PATENT DOCUMENTS

| | | | |
|---|---|---|---|
| 4,276,597 | A | 6/1981 | Dissly |
| 5,541,835 | A | 7/1996 | Dextraze |
| 5,608,621 | A | 3/1997 | Caveney |
| 5,701,451 | A | 12/1997 | Rogers |
| 5,717,923 | A | 2/1998 | Dedrick |
| 5,724,521 | A | 3/1998 | Dedrick |
| 5,751,956 | A | 5/1998 | Kirsch |
| 5,774,868 | A | 6/1998 | Cragun |
| 5,812,997 | A | 9/1998 | Morimoto |

(Continued)

FOREIGN PATENT DOCUMENTS

| | | |
|---|---|---|
| EP | 0869652 A | 10/1998 |
| WO | 0137123 A | 5/2001 |
| WO | 2004051418 A2 | 6/2004 |

OTHER PUBLICATIONS

Final Rejection dated Nov. 23, 2010, issued in U.S. Appl. No. 10/915,975, 19 pages.

(Continued)

*Primary Examiner* — Asghar Bilgrami
(74) *Attorney, Agent, or Firm* — Meunier Carlin & Curfman, LLC

(57) ABSTRACT

The present invention relates to generating time relevant content for electronic communications, such as electronic mail (e-mail). The time relevant content is delivered when the electronic communications are acknowledged by the recipient based upon receipt of an electronic indicator, such as a returned request(s), at a home server. In the case of electronic mail, the time relevant content is dynamic, as it is assembled at the time the e-mail is opened, as opposed to the time when the e-mail is sent, as is the case with conventional or static e-mail and other similar electronic communications.

14 Claims, 14 Drawing Sheets

(56) References Cited

U.S. PATENT DOCUMENTS

| | | | |
|---|---|---|---|
| 5,826,269 A | 10/1998 | Hussey | |
| 5,918,014 A | 6/1999 | Robinson | |
| 5,937,392 A | 8/1999 | Alberts | |
| 5,963,910 A | 10/1999 | Ulwick | |
| 5,974,398 A | 10/1999 | Hanson | |
| 5,983,227 A | 11/1999 | Nazem | |
| 5,991,735 A | 11/1999 | Gerace | |
| 6,006,197 A | 12/1999 | D'Eon | |
| 6,009,407 A | 12/1999 | Garg | |
| 6,026,368 A | 2/2000 | Brown | |
| 6,049,777 A | 4/2000 | Sheena | |
| 6,075,535 A | 6/2000 | Fitzhugh | |
| 6,078,892 A | 6/2000 | Anderson | |
| 6,115,691 A | 9/2000 | Ulwick | |
| 6,128,624 A | 10/2000 | Papiemiak | |
| 6,134,532 A | 10/2000 | Lazarus | |
| 6,144,944 A | 11/2000 | Kurtzman | |
| 6,151,584 A | 11/2000 | Papiemiak | |
| 6,189,030 B1 | 2/2001 | Kirsch | |
| 6,199,106 B1 | 3/2001 | Shaw et al. | |
| 6,205,432 B1 | 3/2001 | Gabbard et al. | |
| 6,208,975 B1 | 3/2001 | Bull | |
| 6,216,129 B1 | 4/2001 | Eldering | |
| 6,236,977 B1 | 5/2001 | Verba | |
| 6,298,356 B1 | 10/2001 | Jawahar | |
| 6,321,209 B1 | 11/2001 | Pasquali | |
| 6,360,221 B1 | 3/2002 | Gough | |
| 6,363,383 B1 | 3/2002 | Kindo | |
| 6,411,961 B1 | 6/2002 | Chen | |
| 6,415,294 B1 | 7/2002 | Niemi | |
| 6,448,958 B1 | 9/2002 | Muta et al. | |
| 6,449,635 B1 | 9/2002 | Tilden, Jr. | |
| 6,460,036 B1 | 10/2002 | Herz | |
| 6,477,575 B1 | 11/2002 | Koeppel | |
| 6,490,584 B2 | 12/2002 | Barrett | |
| 6,553,373 B2 | 4/2003 | Boguraev | |
| 6,601,041 B1 | 7/2003 | Brown | |
| 6,615,212 B1 | 9/2003 | Dutta | |
| 6,618,718 B1 | 9/2003 | Couch | |
| 6,622,125 B1 | 9/2003 | Cragun | |
| 6,654,748 B1 | 11/2003 | Rabung | |
| 6,662,215 B1 | 12/2003 | Moskowitz | |
| 6,721,784 B1 | 4/2004 | Leonard | |
| 6,778,989 B2 | 8/2004 | Bates | |
| 6,801,945 B2 | 10/2004 | Lin | |
| 6,823,320 B1 | 11/2004 | Rubin | |
| 6,839,736 B1 | 1/2005 | Kajita | |
| 6,850,252 B1 | 2/2005 | Hofberg | |
| 6,868,395 B1 | 3/2005 | Szlam | |
| 6,868,525 B1 | 3/2005 | Szabo | |
| 6,876,974 B1* | 4/2005 | Marsh et al. | 705/14.44 |
| 6,883,014 B1 | 4/2005 | McErlean | |
| 6,892,238 B2 | 5/2005 | Lee | |
| 6,904,450 B1 | 6/2005 | King | |
| 6,912,571 B1 | 6/2005 | Serena | |
| 6,915,271 B1 | 7/2005 | Meyer | |
| 6,934,687 B1 | 8/2005 | Papiemiak | |
| 6,938,000 B2 | 8/2005 | Joseph | |
| 6,938,050 B2 | 8/2005 | Le | |
| 6,944,611 B2 | 9/2005 | Flank | |
| 6,944,817 B1 | 9/2005 | Danneels | |
| 6,954,731 B1 | 10/2005 | Montague | |
| 6,959,306 B2 | 10/2005 | Nwabueze | |
| 6,968,333 B2 | 11/2005 | Abbott | |
| 6,970,830 B1 | 11/2005 | Samra | |
| 6,973,436 B1 | 12/2005 | Shkedi | |
| 6,988,096 B2 | 1/2006 | Gupta | |
| 7,006,979 B1 | 2/2006 | Samra | |
| 7,006,981 B2 | 2/2006 | Rose | |
| 7,013,285 B1 | 3/2006 | Rebane | |
| 7,047,318 B1 | 5/2006 | Svedloff | |
| 7,050,990 B1 | 5/2006 | Chu et al. | |
| 7,080,030 B2 | 7/2006 | Eglen et al. | |
| 7,103,563 B1 | 9/2006 | Voisin | |
| 7,149,893 B1 | 12/2006 | Leonard | |
| 7,299,409 B2 | 11/2007 | Joshi | |
| 7,493,499 B1 | 2/2009 | Deaver | |
| 7,580,980 B2 | 8/2009 | Kawashima et al. | |
| 7,599,852 B2 | 10/2009 | Bosarge | |
| 7,647,387 B2* | 1/2010 | Bellare et al. | 709/218 |
| 2001/0029465 A1* | 10/2001 | Strisower | 705/14 |
| 2001/0037242 A1 | 11/2001 | Bataillon | |
| 2001/0044745 A1 | 11/2001 | Shaw | |
| 2002/0010746 A1 | 1/2002 | Jik, Jr. | |
| 2002/0013785 A1* | 1/2002 | Miyazaki et al. | 707/104.1 |
| 2002/0026360 A1 | 2/2002 | McGregor | |
| 2002/0032602 A1 | 3/2002 | Lanzillo, Jr. | |
| 2002/0035568 A1 | 3/2002 | Benthin | |
| 2002/0065850 A1 | 5/2002 | Bandu | |
| 2002/0083140 A1 | 6/2002 | Shin | |
| 2002/0087631 A1* | 7/2002 | Sharma | 709/203 |
| 2002/0107931 A1 | 8/2002 | Singh et al. | |
| 2002/0111863 A1 | 8/2002 | Landesmann | |
| 2002/0112013 A1 | 8/2002 | Walsh | |
| 2002/0116476 A1 | 8/2002 | Eyal et al. | |
| 2002/0120589 A1* | 8/2002 | Aoki | 705/400 |
| 2002/0129002 A1 | 9/2002 | Alberts | |
| 2003/0004882 A1 | 1/2003 | Holler | |
| 2003/0005052 A1* | 1/2003 | Feuer et al. | 709/204 |
| 2003/0033420 A1 | 2/2003 | Eyal et al. | |
| 2003/0037041 A1* | 2/2003 | Hertz | 707/1 |
| 2003/0083937 A1 | 5/2003 | Hasegawa | |
| 2003/0115099 A1 | 6/2003 | Burns, Jr. | |
| 2003/0163370 A1* | 8/2003 | Chen et al. | 705/14 |
| 2003/0171990 A1 | 9/2003 | Rao | |
| 2003/0191689 A1 | 10/2003 | Bosarge | |
| 2003/0195802 A1* | 10/2003 | Hensen et al. | 705/14 |
| 2003/0233409 A1 | 12/2003 | Awada et al. | |
| 2004/0059712 A1 | 3/2004 | Dean | |
| 2004/0059788 A1 | 3/2004 | Marcus | |
| 2004/0098465 A1* | 5/2004 | Seo | 709/217 |
| 2004/0122730 A1* | 6/2004 | Tucciarone et al. | 705/14 |
| 2004/0128293 A1 | 7/2004 | Maeda | |
| 2004/0150673 A1 | 8/2004 | Dobronsky | |
| 2004/0189699 A1 | 9/2004 | Dobronsky | |
| 2004/0199657 A1 | 10/2004 | Eyal et al. | |
| 2004/0215479 A1 | 10/2004 | Dorsey | |
| 2004/0225562 A1 | 11/2004 | Turner | |
| 2004/0249709 A1* | 12/2004 | Donovan et al. | 705/14 |
| 2005/0005028 A1 | 1/2005 | Huang | |
| 2005/0038861 A1 | 2/2005 | Lynn | |
| 2005/0076051 A1 | 4/2005 | Carobus et al. | |
| 2005/0108343 A1 | 5/2005 | Collet et al. | |
| 2005/0114198 A1 | 5/2005 | Koningstein | |
| 2005/0114345 A1 | 5/2005 | Wesinger, Jr. | |
| 2005/0198170 A1 | 9/2005 | LeMay et al. | |
| 2006/0026497 A1 | 2/2006 | Haenlein et al. | |
| 2006/0036608 A1 | 2/2006 | Gutierrez | |
| 2006/0122883 A1 | 6/2006 | Lynn | |
| 2006/0129629 A1 | 6/2006 | Kawashima et al. | |
| 2006/0242411 A1 | 10/2006 | Lin | |
| 2007/0244977 A1 | 10/2007 | Atkins | |
| 2008/0140608 A1 | 6/2008 | Takahashi | |
| 2009/0132276 A1 | 5/2009 | Petera | |

OTHER PUBLICATIONS

Non-final Rejection dated Mar. 2, 2010, issued in U.S. Appl. No. 10/915,975, 14 pages.

Final Rejection dated Oct. 15, 2009, issued in U.S. Appl. No. 10/915,975, 15 pages.

Non-final Rejection dated Dec. 23, 2008, issued in U.S. Appl. No. 10/915,975, 12 pages.

Non Final Office Action of May 7, 2010 in related U.S. Appl. No. 11/449,135, 15 pages.

Final Office Action of Jan. 7, 2011 in related U.S. Appl. No. 11/449,135, 17 pages.

Notice of Allowance for U.S. Appl. No. 11/294,188, dated Dec. 28, 2011, 16 pages.

Notice of Allowance for U.S. Appl. No. 11/294,188, dated Aug. 12, 2011, 20 pages.

Notice of Allowance for U.S. Appl. No. 11/294,188, dated Apr. 27, 2011, 30 pages.

(56) References Cited

OTHER PUBLICATIONS

Notice of Allowance for U.S. Appl. No. 11/294,188, dated Dec. 23, 2010, 18 pages.
Notice of Allowance for U.S. Appl. No. 11/294,188, dated Sep. 1, 2010, 19 pages.
Office Action for U.S. Appl. No. 11/294,188, dated Dec. 21, 2009, 61 pages.
Office Action for U.S. Appl. No. 11/101,857 dated Jun. 13, 2011, 45 pages.
Office Action for U.S. Appl. No. 11/101,857 dated Oct. 13, 2010, 18 pages.
Office Action for U.S. Appl. No. 11/101,857 dated Jan. 4, 2010, 22 pages.
Notice of Allowance for U.S. Appl. No. 11/449,135 dated Nov. 8, 2011, 25 pages.
Office Action for U.S. Appl. No. 11/449,135 dated May 7, 2010, 15 pages.
Rivest, R., Memorandum, "The MD5 Message-Digest Algorithm", MIT Laboratory for Computer Science and RSA Data Security, Inc., Apr. 1992, retrieved from the internet at http://www.ietf.org/rfc/rfc1321.txt, 20 pages.
Blowfish (cipher), Wikipedia, the free encyclopedia, retrieved from the internet at http://en.widipedia.org/wiki/Blowfish_(cipher) on Jun. 6, 2006, 4 pages.
Office Action for U.S. Appl. No. 11/294,188 dated May 21, 2009, 41 pages.
Office Action for U.S. Appl. No. 11/101,857 dated May 29, 2009, 18 pages.
Office Action for U.S. Appl. No. 11/294,188 dated Aug. 15, 2008, 33 pages.
Office Action for U.S. Appl. No. 11/101,857 dated Sep. 4, 2008, 24 pages.
EP Search Report dated Mar. 13, 2006, 5 pages.
Weiguang, Shao et al., "An Agent Architecture for Supporting Individualized Services in Internet Applications", Tools With Artificial Intelligence, 1998. Proceedings Tenth IEEE International Conference in Taipei, Taiwan Nov. 10-12, 1998, Piscatawa, NJ, USA, IEEE, US Nov. 10, 1998, p. 140-147.
Office Action for U.S. Appl. No. 10/915,975, dated Jun. 15, 2011, 20 pages.
Office Action for U.S. Appl. No. 10/915,975, dated Feb. 24, 2012, 22 pages.
Final Office Action for U.S. Appl. No. 10/915,975, dated Dec. 11, 2012, 30 pages.

\* cited by examiner

```
KEY 1
UNIQUE ID : user@abc.com
KEYWORD : NEW CARS
MAILING ID : 100001
```
```
KEY 2
UNIQUE ID : joe@xyz.com
KEYWORD : NEW CARS
MAILING ID : 100001
```
```
KEY 3
UNIQUE ID : user@abc.com
KEYWORD : MORTGAGE
MAILING ID : 100002
```   — 43a'
```
KEY 4
UNIQUE ID : sam@pqr.com
KEYWORD : DIET
MAILING ID : 100003
```

FIG.6

METHOD AND SYSTEM FOR DYNAMICALLY GENERATING ELECTRONIC COMMUNICATIONS

CROSS-REFERENCES TO RELATED APPLICATIONS

This application is a continuation application of commonly owned U.S. patent application Ser. No. 10/915,975, entitled: METHOD AND SYSTEM FOR DYNAMICALLY GENERATING ELECTRONIC COMMUNICATIONS, filed on Aug. 11, 2004, that claims priority from and is related to commonly owned U.S. Provisional Patent Application Ser. No. 60/495,027, entitled: DYNAMICALLY GENERATED EMAIL, filed on Aug. 14, 2003. Both of these patent applications are incorporated by reference in their entirety herein.

FIELD OF THE INVENTION

The present invention relates to content delivery over networks and components associated therewith. In particular, the present invention relates to electronic mail, commonly known as e-mail, as sent over a network, such as the Internet, with its content generated when the user opens the requisite electronic mail.

BACKGROUND OF THE INVENTION

Electronic communications have dramatically changed the ways in which people communicate. Electronic mail, commonly referred to as e-mail, is a widely used form of electronic communication. E-mail is the exchange of computer-stored messages by telecommunication, over a network, such as the Internet. E-mail accounts for the largest percentage of total traffic on the Internet. E-mail usage is expected to increase exponentially in the next few years as increasing numbers of people have access to computers, and therefore, the World Wide Web (WWW).

E-mail communications are desirable, as they are current, usually in real time, and are non-intrusive. Conversely, a telephone call is intrusive, as it must be attended to at the moment it is received, and may interfere with the recipient's activities. The e-mail recipient may open the e-mail when desired, and may delete the e-mail without reading it.

E-mail distribution to individuals and organizations is quick and economical. Senders create recipient lists, that may include thousands of recipients. Recipient e-mail addresses can be added and deleted from the lists as desired. The e-mail is composed once and sent to multitudes of recipients, all of whom receive the e-mail instantaneously. The e-mail can be duplicated and sent to recipients from another recipient list, typically in the matter of minutes.

However, many e-mails that are sent are time sensitive, and become irrelevant, as they are not opened immediately, or at least close to the time that they were sent. Moreover, e-mails are static, as their content is in a final or fixed configuration prior to being sent. The content of these static e-mails can not be changed, so if opened after the desired time, they become irrelevant.

When used for advertising, the production of static e-mails, of fixed content prior to being sent, is problematic. This is because advertising campaigns are usually time-sensitive. If recipients do not open the e-mail within the requisite time, they do not benefit from the advertisement. This amounts to a waste of resources for both the sender and the recipient. Moreover, the recipient may view the advertiser as an annoyance to a point where they refuse to patronize the advertiser, the opposite of the result desired.

SUMMARY OF THE INVENTION

The present invention overcomes the drawbacks of contemporary static electronic mail (e-mail), by providing e-mails whose content is generated dynamically, when the e-mail is opened by the intended recipient. The e-mail of the present invention is generated dynamically, as its content is assembled once the e-mail has been opened. This is in contrast to conventional static e-mail, where the content is fixed prior to the e-mail being sent. As a result of the present invention, e-mails do not waste resources, as the recipients receive time-relevant content in real time.

The present invention also pairs dynamically generated content for e-mails with keywords, in order that the recipient receive targeted content. This allows access to numerous text based keyword advertisers that are currently running in search engines, whose content can be distributed in e-mail, in accordance with the invention. The keywords from data, as received from the e-mail recipient, facilitate the content provider (assembler) to access the most relevant content, from the requisite content server(s). The data from the content server(s) will ultimately become the content for the opened e-mail.

Additionally, for example, the present invention utilizes Pay Per Click (PPC) content. PPC content is typically advertising, that is stored on various content servers along a network, for example, the Internet. This PPC advertising is also keyword based, and allows providers of PPC content to serve their advertisements based on their real time bid process and budget restraints.

The present invention is typically performed in two phases. A first phase involves rendering the content of an e-mail to a client at the time the e-mail is opened. The content rendered to the opened e-mail typically includes an activatable link, that is paired (associated) with the content provided (rendered) to the e-mail when it is opened, typically in the form of one or more images. The second phase directs the browser (of the user) associated with the opened e-mail, to a target web site, via the link that has been activated, once the user has clicked his mouse on the rendered image or portion thereof, of the opened e-mail.

An embodiment of the invention is directed to a method for providing content into electronic communications, for example, electronic mail. The method includes sending an electronic communication to a recipient, receiving at least one indicator that the electronic communication has been opened by the recipient, and providing content to the opened electronic communication in response to receiving the at least one indicator that the electronic communication has been opened.

Another embodiment of the invention is directed to a method for providing content into electronic communications, for example, electronic mail. The method includes sending an electronic communication to a recipient, receiving an indicator that the electronic communication has been opened by the recipient, and providing content to the opened electronic communication in response to receiving the indicator that the electronic communication has been opened. The content is determined from a keyword, for example, of single or multiple words, that is taken from the indicator. The indicator is typically a request that was placed into the sent electronic communication, that is returned when the electronic communication is opened.

Another embodiment is directed to another method for providing content into electronic communications, for example, electronic mail. The method includes, sending an electronic communication to a recipient, receiving an indicator that the electronic communication has been opened by the recipient, and providing content to the opened electronic communication in response to receiving the indicator that the electronic communication has been opened. The content includes data, that upon being activated, provides a browsing application associated with the opened electronic communication with at least one uniform resource locator for at least one target web site. The target web site may be, for example, a web site associated with the provider of the content.

Another embodiment is directed to still another method for providing content into electronic communications, for example, electronic mail. The method includes, sending an electronic communication to a recipient, receiving an indicator that the electronic communication has been opened by the recipient, and providing content to the opened electronic communication in response to receiving the indicator that the electronic communication has been opened. Content is provided by taking at least one keyword from the indicator, obtaining content associated with content providers for the at least one keyword in an order based on a predetermined priority of the content providers at the time the content is obtained, and providing the content associated with at least one content provider to the opened electronic communication in accordance with the order based on the predetermined priority. The content associated with each content provider includes data, that upon being activated, provides a browsing application associated with the opened electronic communication with at least one uniform resource locator for at least one target web site. The target web site may be, for example, a web site associated with the content provider.

Another embodiment of the invention is directed to a system for providing content to electronic communications, for example, electronic mail. The system includes at least one means for sending an electronic communication, the electronic communication including at least one request; means for receiving at least a portion of the at least one request from the electronic communication once the electronic communication has been opened; and, means for providing content to the opened electronic communication. The means for providing the content include, means responsive to the receipt of at least a portion of the request; means for obtaining content from at least one source based on at least one keyword extracted from the at least a portion of the received request, the content including data, that upon being activated, provides a browsing application associated with the opened electronic communication, with at least one uniform resource locator for at least one target web site. The target web site may be, for example, associated with the provider of the content. The system also includes means for sending at least a portion of the obtained content, including the activatable data, to the opened electronic communication.

Another embodiment of the invention is directed to an apparatus for providing content to electronic communications, for example, electronic mail. The apparatus includes at least one storage media (for example, caches) and a processor. The processor is programmed to, send an electronic communication to a recipient; receive a first indicator that the electronic communication has been opened by the recipient; and, respond to receiving the first indicator that the electronic communication has been opened. The response includes obtaining content including a plurality of listings from at least one source as determined from at least one keyword, that is taken from the first indicator, each of the listings associated with at least one entity, and including first data, that directs a browsing application to at least one target web site. The target web site may be, for example, associated with the entity associated with the listing. The plurality of listings is stored in the at least one storage media, and at least one image representing the at least one listing of the plurality of listings and second data for the at least one listing being sent, is sent to the opened electronic communication. The second data is such that when it is activated, the first data for the at least one listing is accessed.

Another embodiment is directed to an apparatus for providing content to electronic communications. The apparatus includes means for sending an electronic communication to a recipient; means for receiving at least one indicator that the electronic communication has been opened by the recipient; and, means for providing content to the opened electronic communication in response to receiving the at least one indicator that the electronic communication has been opened. The content typically includes data for directing a browser associated with the opened electronic communication to at least one target web site. The content providing means include means for obtaining at least one keyword from the at least one indicator; and, means for obtaining content based on the at least one keyword.

BRIEF DESCRIPTION OF DRAWINGS

Attention is now directed to the drawings, where like reference numerals or characters indicate corresponding or like components. In the drawings:

FIG. 6 is a diagram of a key cache in accordance with an embodiment of the invention;

DETAILED DESCRIPTION OF THE DRAWINGS

The present invention is related to systems and methods for delivering time relevant content to electronic communications, such as electronic mail (e-mail), that are sent over digital, electronic, wireline or wireless networks, such as the Internet. The content for the e-mail is time relevant and dynamic, as it is generated in real-time, and assembled when the electronic communication is opened by the recipient. Should the electronic communication be closed and reopened at a subsequent time, it may have content different from the content when originally opened, as its content is assembled at the time of reopening.

Figure 1:
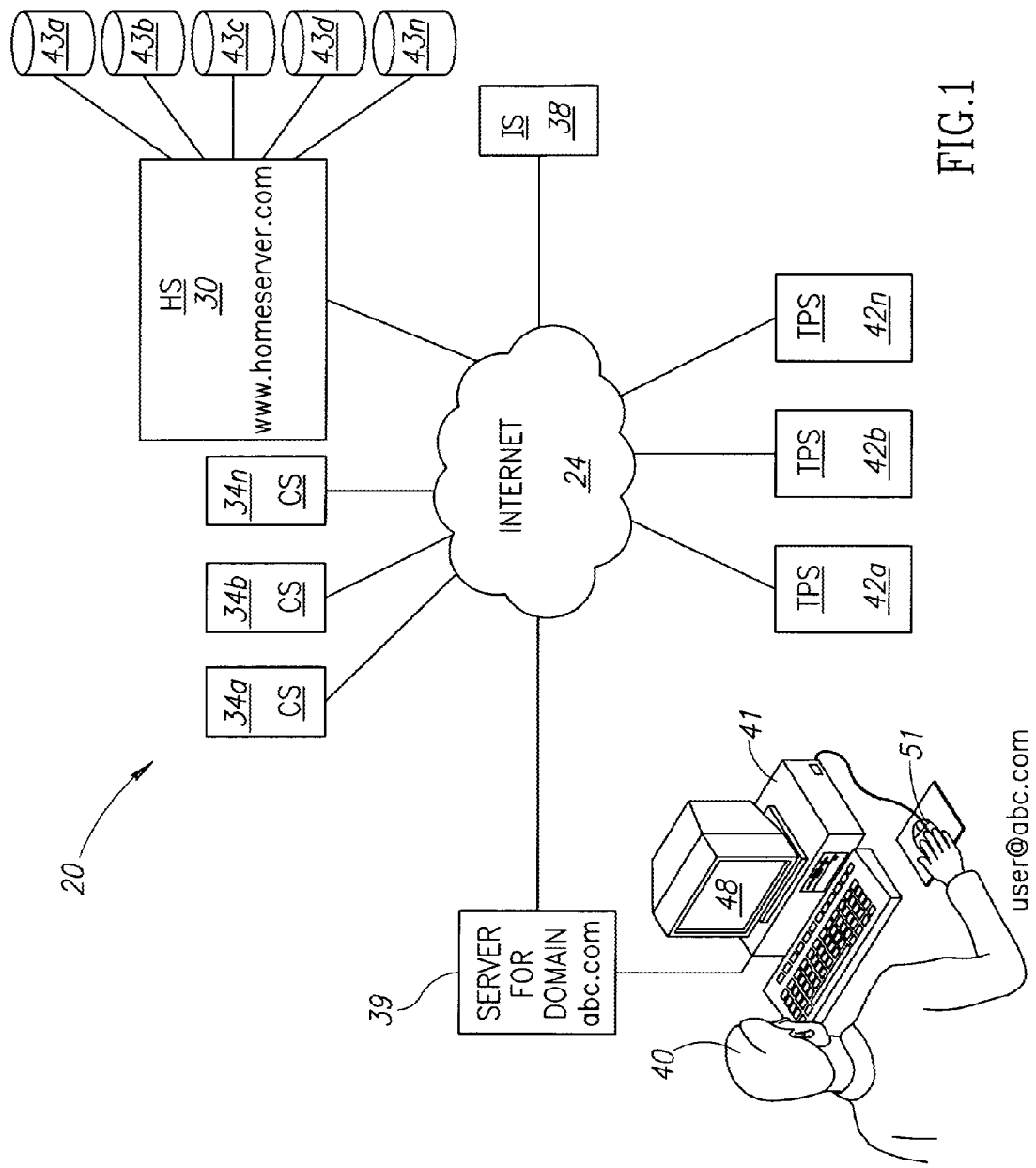
FIG. 1 is a diagram of an exemplary system on which an embodiment of the invention is performed.

FIG. 1 shows the present invention in an exemplary operation. The present invention employs a system 20, formed of various servers and server components, that are linked to a network, such as a wide area network (WAN), that may be, for example, the Internet 24.

There are, for example, at least three kinds of servers that form the system 20. These servers typically include a Home Server (HS) 30, one or more content servers (CS) 34a-34n, and an imaging server (IS) 38. These servers 30, 34a-34n and 38 are linked to the Internet 24, so as to be in communication with each other. The servers 30, 34a-34n and 38 include multiple components for performing the requisite functions as detailed below, and the components may be based in hardware, software, or combinations thereof. The servers 30, 34a-34n and 38 may also have internal storage media and/or be associated with external storage media.

The servers 30, 34a-34n, 38 of the system 20 are linked (either directly or indirectly) to an endless number of other servers and the like, via the Internet 24. Other servers, exemplary for describing the operation of the system 20, include a domain server 39 for the domain (for example, the domain "abc.com") of the user 40 (for example, whose e-mail address is user@abc.com), linked to the computer 41 of the user. Still other servers may include third party servers (TPS) 42a-42n, controlled by content providers and the like.

While various servers have been listed, this is exemplary only, as the present invention can be performed on an endless numbers of servers and associated components, that are in some way linked to a network, such as the Internet 24. Additionally, all of the aforementioned servers include components for accommodating various server functions, in hardware, software, or combinations thereof, and typically include storage media, either therein or associated therewith. Also in this document, the aforementioned servers, storage media, components can be linked to each other or to a network, such as the Internet 24, either directly or indirectly.

The Home Server (HS) 30 is of an architecture that includes components for handling electronic mail, to perform an electronic mail (e-mail) server functionality, including e-mail applications. The architecture also includes components for providing numerous additional server functions and operations, for example, comparison and matching functions, policy and/or rules processing, various search and other operational engines. The Home Server (HS) 30 includes various processors, including microprocessors, for performing the aforementioned server functions and operations and storage media, either internal or associated therewith, such as caches 43a-43n. While these caches 43a-43n are shown, this is for explanation purposes, as the Home Server (HS) 30 may be associated with additional caches, databases, as well as numerous other additional storage media, both internal and external thereto.

The Home Server (HS) 30 receives requests from e-mail clients, for example, America Online® (AOL®), Outlook®, Eudora®, or other web-based clients, and composes and sends e-mails to intended recipients over the network. In this document, the client is an application that runs on a computer, workstation or the like and relies on a server to perform some operations, such as sending and receiving e-mail. Also, for explanation purposes, the Home Server (HS) 30 may have a uniform resource locator (URL) of, for example, www.home-server.com.

For example, the intended recipient or user 40 has a computer 41 (such as a multimedia personal computer with a Pentium® CPU, that employs a Windows® operating system), that uses an e-mail client. The computer 41 is linked to the Internet 24. This Home Server (HS) 30 typically employs a search engine, or links to one (in another server or the like via the Internet 24), in order to direct the received request to the most suitable content server (CS) 34a-34n. While a single Home Server (HS) 30 is shown, the Home Server (HS) 30 may be formed of multiple servers and/or components, and may also be formed from still other servers with e-mail functionalities.

Content Servers (CS) 34a-34n (one or more) are also linked to the Internet 24. The content servers (CS) 34a-34n provide content, typically in text form, for the imaging server (IS) 38, typically through the Home Server (HS) 30, and typically, in response to a request from the Home Server (HS) 30, as detailed below. These content servers (CS) 34a-34n may be, for example, Pay-Per-Click (PPC) servers of various content providers, such as internal providers, or external providers, for example, Overture Services, Inc. or Findwhat, Inc.

At least one imaging server (IS) 38 is linked to the Internet 24. The imaging server (IS) 38 functions to convert text (data in text format) from the content servers (CS) 34a-34n, as received through the Home Server (HS) 30, to an image (data in an image format). After conversion into an image, the image is typically sent back to the Home Server (HS) 30, to be placed into an e-mail opened by user 40, as detailed below. Alternately, the imaging server (IS) 38 may send the image directly to the e-mail client associated with the user 40, over the Internet 24.

Figure 2:
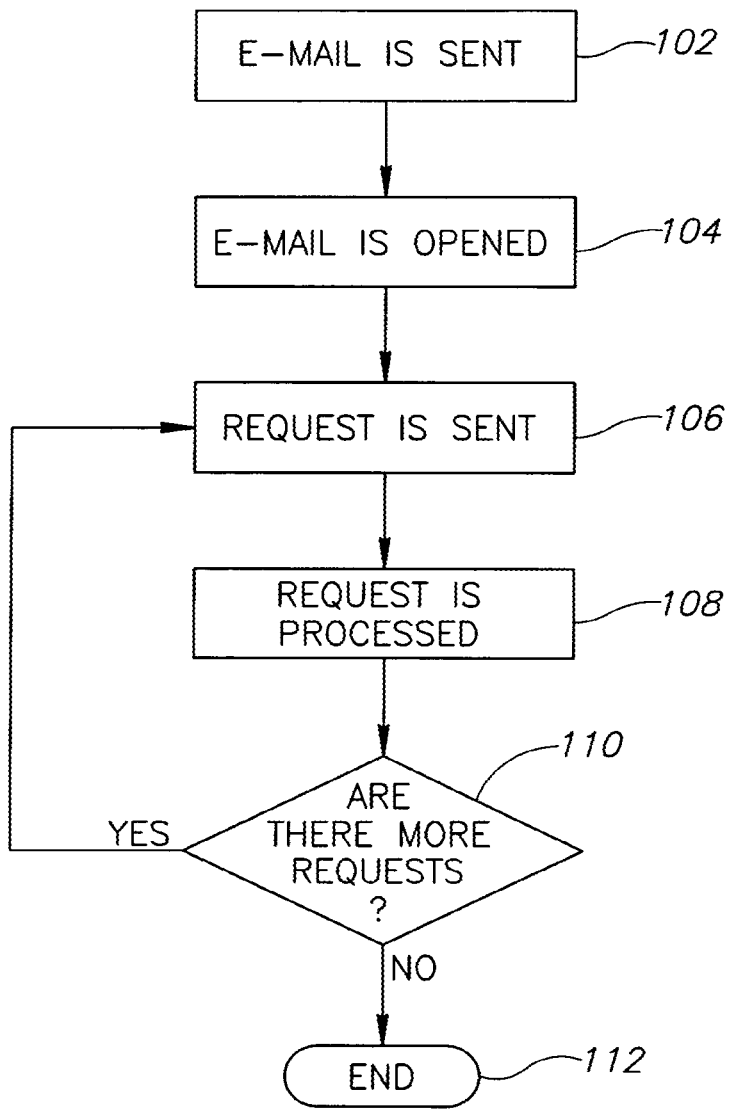
FIG. 2 is a flow diagram of a process for generating the content for an e-mail in accordance with an embodiment of the invention.

Turning also to FIG. 2, an exemplary implementation of a process in accordance with an embodiment of the present invention will now be described. FIG. 2 is a flow diagram of the process (method). The process of FIG. 2 may be the first phase of a larger process. For example, the first phase may involve rendering an e-mail to an e-mail client, while the second phase, shown in FIG. 10 and detailed below, is dependent on the first phase. The second phase directs the user to a target web site, via a link, that is activated once the user has clicked his mouse 51 on the dynamically rendered image or a portion thereof, of the opened e-mail, that is paired with the link.

Initially, the computer 41 of the user 40 includes an e-mail client (detailed above), installed thereon, that provides the user with a unique access and the ability to utilize one or more e-mail addresses. For example, the user 40 has an e-mail address, user@abc.com, through which he receives his e-mail from the domain server 39, that hosts the domain abc.com, of which the user 40 is a member. The computer 41 also includes a web browser, browsing software, application, or the like, to access web sites or web pages from various servers and the like, on the Internet 24. Some exemplary web browsers/web browsing software include, Internet Explorer®, from Microsoft, Redmond, Wash., and Netscape® Navigator®.

An e-mail is sent to the e-mail client associated with the computer 41 of the user 40, typically from the Home Server (HS) 30, at block 102. This initially or first sent e-mail, for explanation purposes, is referred to as the "sent e-mail".

The sent e-mail may be, for example, in Hypertext Markup Language (HTML), and may include one or more Hypertext Transport Protocol (HTTP) source requests. These HTTP source requests typically reference the Home Server (HS) 30.

Figure 3:
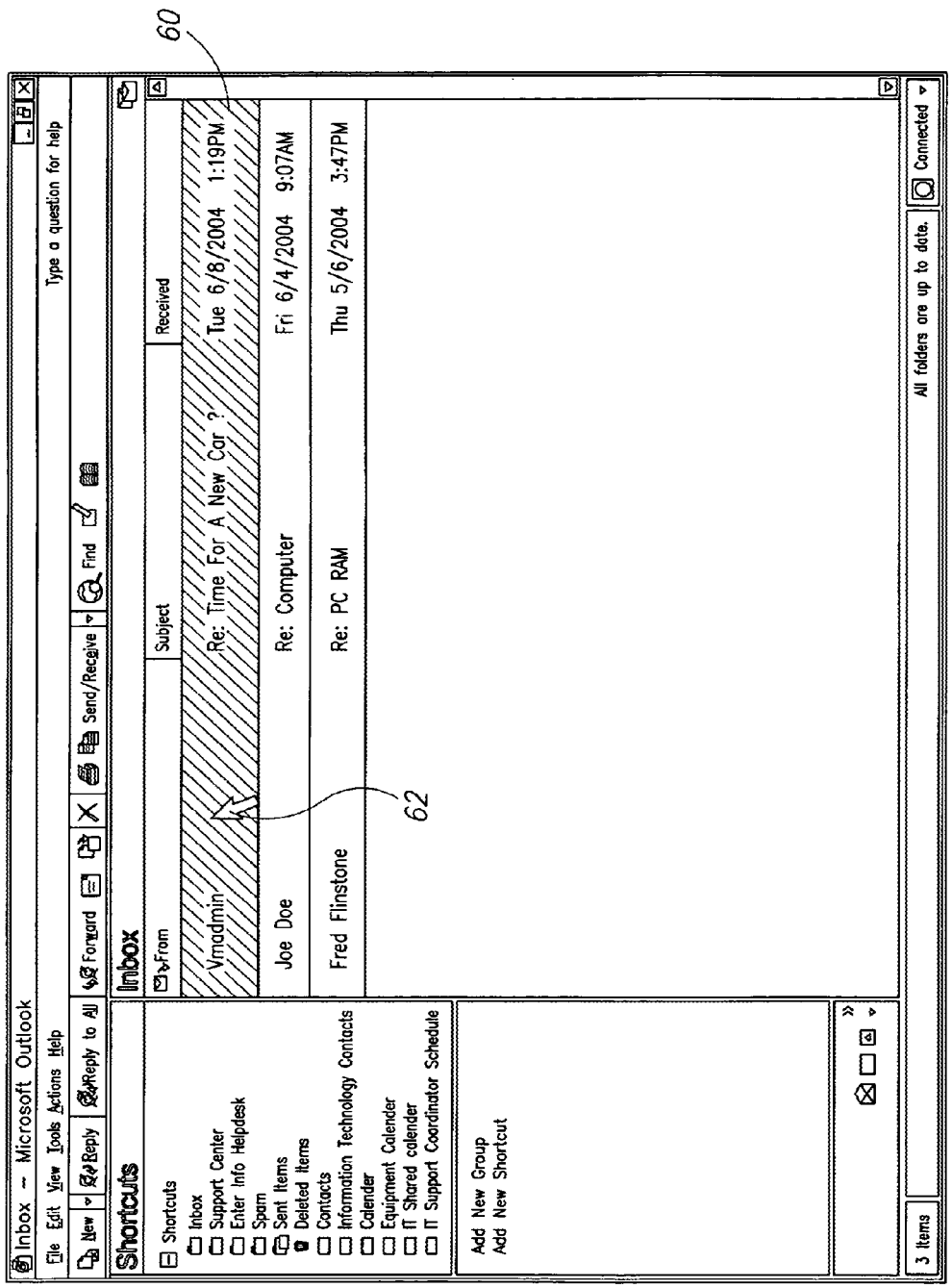
FIG. 3 is a screen shot showing e-mail communications in the mailbox of a recipient.

The sent e-mail includes a program that provides the body of the e-mail when the e-mail is opened. The program provides a template (FIG. 4), that forms the basic structure or framework for the image(s) of the sent and opened e-mail, and, zero or more HTTP Source requests for zero or more static images. The sent e-mail may also include HTML constructs and text, such as plain text, HTML headers, list constructs and the like. The sent e-mail, as received by the e-mail client, typically appears on the screen (monitor) 48 of the user's computer as a line of text 60 (shown as shaded for emphasis only) identifying the sender, subject and other information, as shown in FIG. 3.

The sent e-mail typically includes one or more requests. The total number of request(s) is represented by "N". A single request typically corresponds to a single image to be rendered (into the template of the e-mail image) when the e-mail is opened by the user 40 (as detailed below).

Each of the one or more requests in the e-mail may include data (or data elements) such as: a) a unique identifier (ID); b) at least one keyword, or data corresponding to at least one keyword; c) mailing identifier (ID); d) position data; and, e) a max number, corresponding to the maximum number of images (represented in this document by "N") that will be dynamically generated and rendered for this particular e-mail.

Each of the one or more requests in a sent e-mail typically includes all five of these data elements. However, if there is only a single request in a sent e-mail, position data is typically not included, because there is only one position for the dynamically generated text in the request (and the max number is 1).

The unique identifier, also known as a user identifier (ID), may be, for example, an e-mail address for the recipient of the sent e-mail, or any other data that guarantees uniqueness for the particular sent e-mail (and its corresponding returned request(s)). A unique identifier is attached to each particular user. The keyword is a word or group of words, such as a phrase, or other suitable identifier for one or more data object(s).

The mailing identifier (ID) is a sequence of characters indicative of the batch from which the particular e-mail was sent. For example, a mailing identifier may be a sequence of numbers.

The position data is data indicative of the location in the template where the image corresponding to that particular request is to be rendered (placed or located). The max number is typically equal to N, as each request typically results in a single image being dynamically generated.

When e-mail (the sent e-mail) is downloaded by the e-mail client of the user 40, the e-mail client opens a connection or "pipe" to the Home Server (HS) 30. The e-mail client associated with the user 40, pulls data from the Home Server (HS) 30, and may pull data asynchronously. The data pulled from the Home Server (HS) 30 includes data required to display the resultant dynamically generated text (in the form of images), for example, a template 150, as shown in FIG. 4, and the single or multiple requests.

At block 104, the user 40 opens this e-mail, typically by clicking the mouse 51 (of the computer 41), as shown by the arrow 62, anywhere along the line 60, that represents the sent e-mail as received in the user's mail box, as shown in FIG. 3. This opening, for purposes of explanation herein, occurs at a time indicated as t.sub.1. Pulling of data from the Home Server (HS) 30 by the e-mail client is continuous, as long as requests are being processed, as described below.

Figure 4:
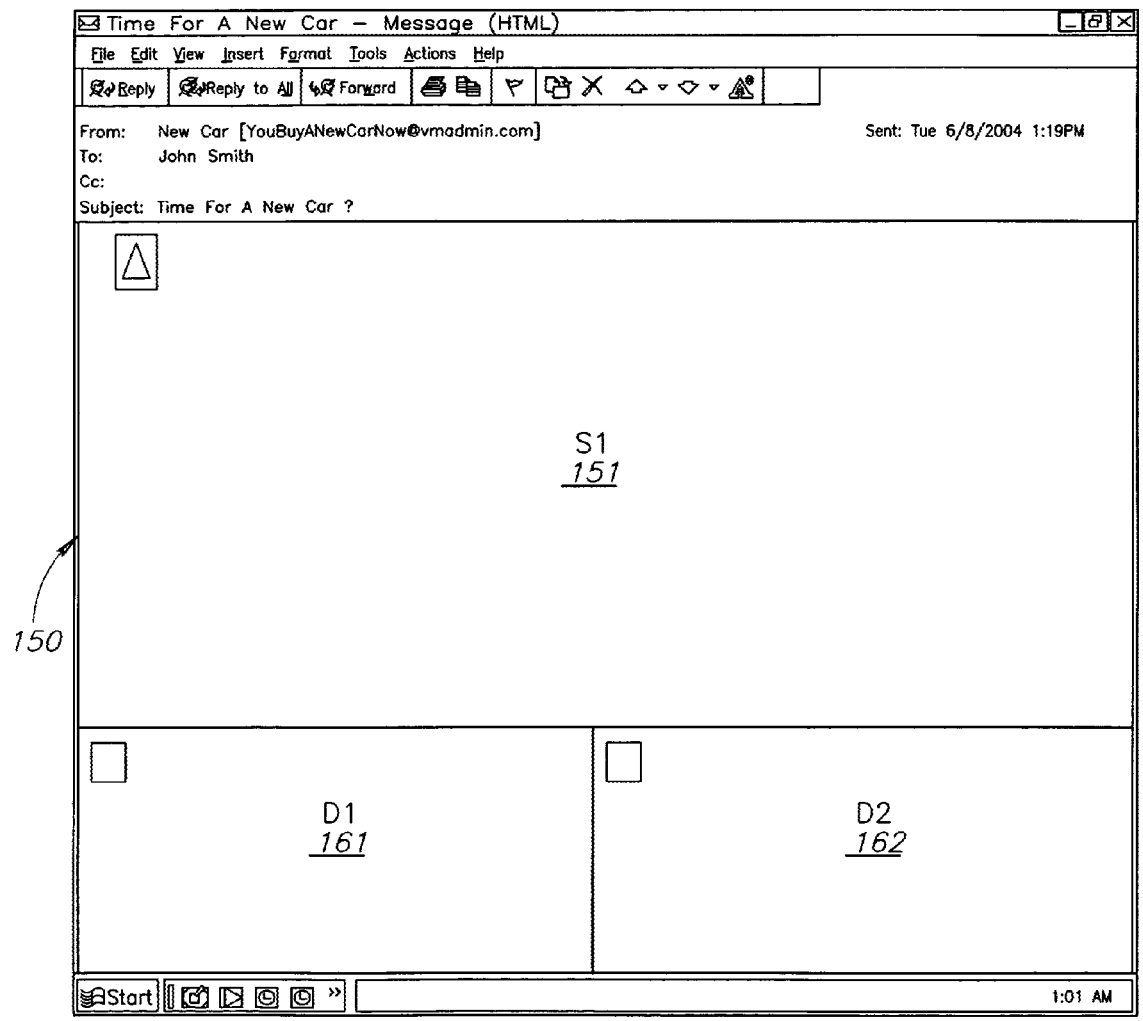
FIG. 4 is a screen shot of an exemplary template in accordance with an embodiment of the invention.

Turning to FIG. 4, an exemplary template 150, that forms part of the body of the opened e-mail, is built out in three sections 151, 161 and 162. A first section S1 151 is designed to receive a static image, having content that is fixed prior to the time the e-mail was sent. The image for the section S1 151 is typically pulled from the Home Server (HS) 30 along with the template 150, when the e-mail is opened, as detailed above.

Sections D1 161 and D2 162, for example, are designed to receive the dynamically generated images, that are generated and assembled when and only if the e-mail is opened. Section D1 161, for example, is the first position for the dynamically generated images, and as such, receives the image from the first listing of the listing text (described below), resulting from the first request being processed; this first request, for example, has position data (N=1) corresponding to this first position. Similarly, Section D2 162, for example, is the second position for the dynamically generated images, and as such, receives the image from the second listing of the listing text (described below), resulting from the second request being processed; this second request, for example, has position data (N=2) corresponding to this second position.

With the connection (pipe) now open, the e-mail client sends one or more requests from the sent e-mail (that has now been opened), to the Home Server (HS) 30, at block 106. Each of these one or more requests sent from the e-mail client to the Home Server (HS) 30 is referred to as a "sent back" request. Each "sent back" request includes portions of, and typically all of the data (or data elements) from the corresponding requests in the sent e-mail. For example, each sent back request is typically formed of data (data elements) including: a) a unique identifier; b) at least one keyword, or other suitable identifier for at least one data object typically within a server, such as one of the content servers (CS) 34*a*-34*n*; c) a mailing identifier; d) position data; and, e) a max number.

The Home Server (HS) 30 processes each request, one at a time, at block 108. This sub process of processing the request is described in detail below, with respect to FIG. 5. The result of each processed request includes obtaining text from a content server (CS) 34*a*-34*n* or cache (or other similar storage medium) 43*a*-43*n*, that may be associated with the Home Server (HS) 30, and returning it to the Home Server (HS) 30. The Home Server (HS) 30 sends this data (e.g., in text form) to the imaging server (IS) 38, that generates an image(s) corresponding to the received data (text data). This generated image is returned to the e-mail client of the user, through the Home Server (HS) 30. The aforementioned data transfers may occur over previously opened and/or existing connections or pipes in the Internet 24 (network).

In the case of an HTTP request, the generated image is sent back to the e-mail client associated with the user 40, through the open connection or pipe. Alternately, for non-HTTP requests, the Home Server (HS) 30 could generate one or more new open connections or pipes, that are different than the previously existing connections or pipes over which the request was sent to the Home Server (HS) 30. It is over these new connection(s) or pipe(s) that the image, from the imaging server (IS) 38 may be transferred from the Home Server (HS) 30 to the e-mail client associated with the user 40, over the Internet 24.

The process moves to block 110, where it is then determined, typically in the Home Server (HS) 30, if there are more requests to be processed. If there are not any more requests to be processed, the process ends at block 112.

If there are more requests to be processed, the process returns to block 106. The next request of the total number or "N" requests is sent, and the process continues from block 106, as described above. The process will repeat until all N requests have been processed, and once all N requests have been processed, the process ends at block 112.

Figure 5:
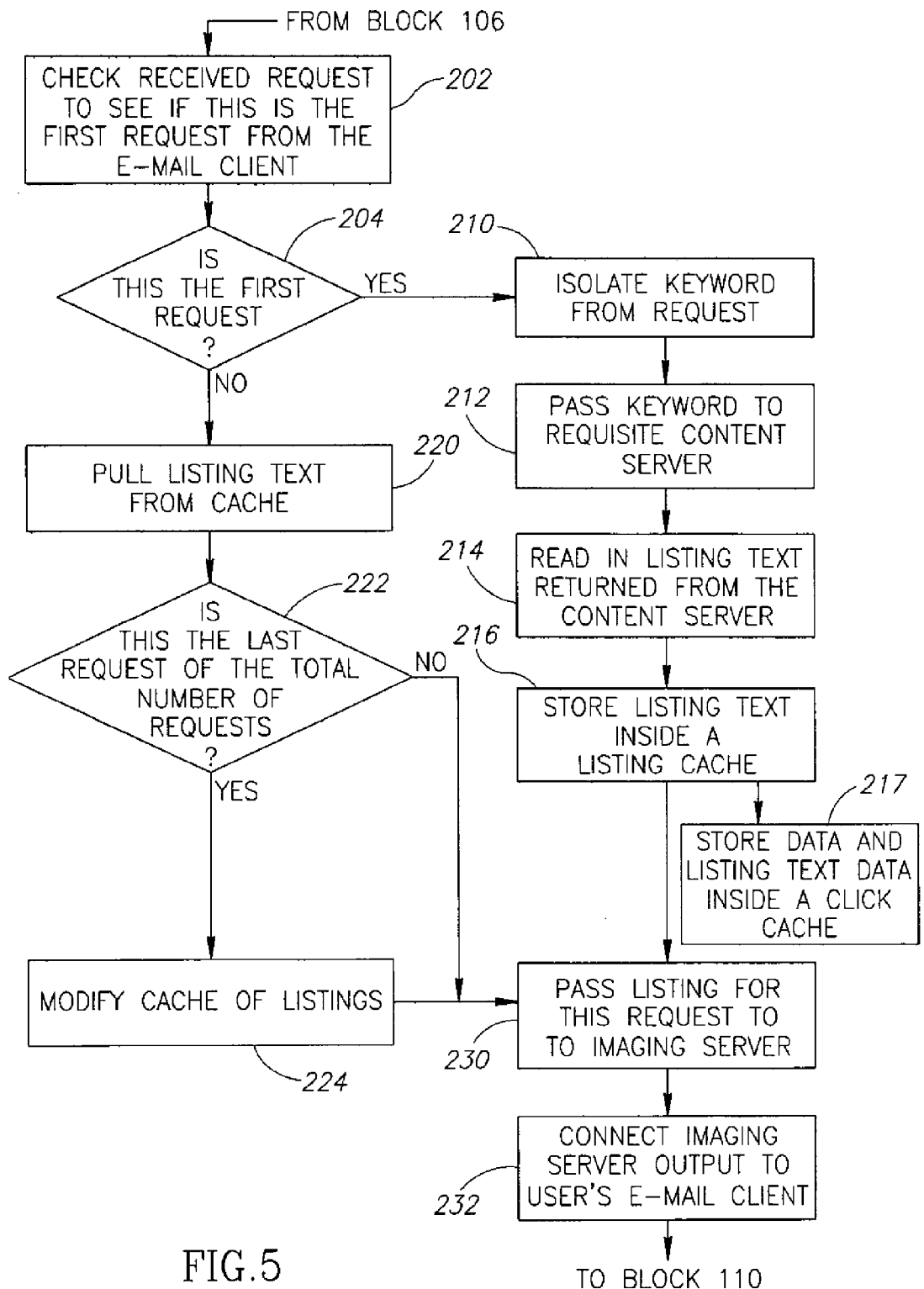
FIG. 5 is a flow diagram of the request processing sub process of FIG. 2.

Attention is now directed to FIG. 5, that shows a flow diagram of block 108 of FIG. 2, detailing the processing of requests. In this process, requests are processed one at a time, on a "first in" basis.

Initially, the Home Server (HS) 30, upon receiving the request, at block 202, checks the received request to determine if it is the first request from the e-mail client of the user 40.

At block 204, a determination if the request is the first request is made. This determination includes extracting the unique identifier from the request (the "sent back" request) that the e-mail client has returned to the Home Server (HS) 30. The unique identifier, plus the keyword, or a variant of it, and the mailing identifier are grouped (combined) to define a key at the Home Server (HS) 30, in accordance with the policy or rules of the Home Server (HS) 30. The key is queried against all other keys in a cache, for example, the cache 43a, known as a key cache, associated with the Home Server (HS) 30, for a match. Matching keys may be of identical or similar keys, in accordance with predetermined rules and/or policies programmed into the component(s) of the Home Server (HS) 30.

If a matching key is not found in the key cache 43a, this is the first request, and the process moves to block 210. The key cache 43a is empty of this particular key. Accordingly, the unique identifier plus the keyword and the mailing identifier becomes a key and is stored in the cache 43a, as shown, for example, in FIG. 6. All of the requests from a particular e-mail ("sent e-mail") have the same key. Alternately, if a matching key is found, the process moves to block 220.

As shown in FIG. 6, keys, indicated by KEY 1 to KEY 4 are unique to each opened e-mail for a particular recipient (user), in accordance with the time each e-mail was opened. For, example, the user with a unique identifier (ID) of user abc-.com has opened two different e-mails, whereby he will receive the content corresponding to each specific e-mail, based on the keywords. Similarly, in FIG. 6, the user "joe@xyz.com" may receive different content than the user "user@abc.com" even though their requests were based on the same keyword "NEW CARS", and they received their e-mail in the same batch, as indicated by the same mailing identifier.

Also, the number of requests "N" is stored in a request cache, along with a key. A request cache may be, for example, the cache 43b.

Turning to block 210, the request being processed is the first request. The keyword in the request is isolated. The keyword is typically in the form of alphanumeric data, and may be an actual keyword, or a keyword group identifier. The keyword is translated into data, recognizable and usable by the requisite content servers (CS) 34a-34n.

The process now moves to block 212, where the keyword (data corresponding to the keyword) is read, and in accordance with the reading, it is passed to a designated content server (CS) 34a-34n, over the Internet 24. The passing to the specific content server is typically in accordance with one or more rules, preprogrammed into the Home Server (HS) 30 or by a policy processor associated with the Home Server (HS) 30. The policies and/or rules are typically time-sensitive, to be applicable in real-time. For example, the keyword may be such, that once read, the preprogrammed rules will be applied. The keyword data will be passed to a specific content server, such as content server (CS) 34a, over Internet 24.

The content servers (CS) 34a-34n may include prearranged listings. Alternately, for example, one or more of the content servers (CS) 34a-34n may be for Pay Per Click (PPC) advertising content. In PPC advertising, the content server creates a listing text, with listings being prioritized, based on the amount an advertiser will pay for a user who clicks their mouse on the advertiser's link in order to direct the user's browser to the advertiser's designated (targeted) web site (or web page).

Alternately, the keyword can be passed to a content server (CS) 34a-34n that performs a search engine function and generates a listing text, typically of N listings. N corresponds to the number of requests in the sent e-mail.

The content server (CS) 34a-34n, for example, content server (CS) 34a, that received the passed keyword (keyword data), is queried for acceptance of the keyword (keyword data), and returns a listing text to the Home Server (HS) 30. This listing text is read into the Home Server (HS) 30, at block 214. Data exchanges, between the Home Server (HS) 30 and the content server (CS) 34a (representative of all content servers (CS) 34a-34n), are typically accomplished via Extensible Markup Language (XML).

The listing text, that is returned to the Home Server (HS) 30 from the content server (CS) 34a, is assigned a particular key, corresponding to the new key created in the key cache 43a (as a result of a matching key not being found), and includes the top "N" results, in the form of N listings. N is the total number of requests in the originally sent e-mail, as detailed above. Each listing of the listing text typically includes a title or headline for the content (e.g., the advertisement) to be returned to the e-mail client of the user 40, at least one target uniform resource locator (URL) for one or more servers, such as third party servers (TPS) 42a-42n, and data for the body of the content to be returned. The data for the body of the content to be returned includes data in text form and position data, indicating the location for the data in text form in the template. The aforementioned portions of the listing text can be parsed, in accordance with the process being performed thereon.

The listing text is then stored in a cache, for example, the listing cache 43c, at block 216. The key assigned to the listing text, upon its being stored in the listing cache 43c, is linked to its corresponding key, typically in another cache, such as the key cache 43a.

Figure 7:
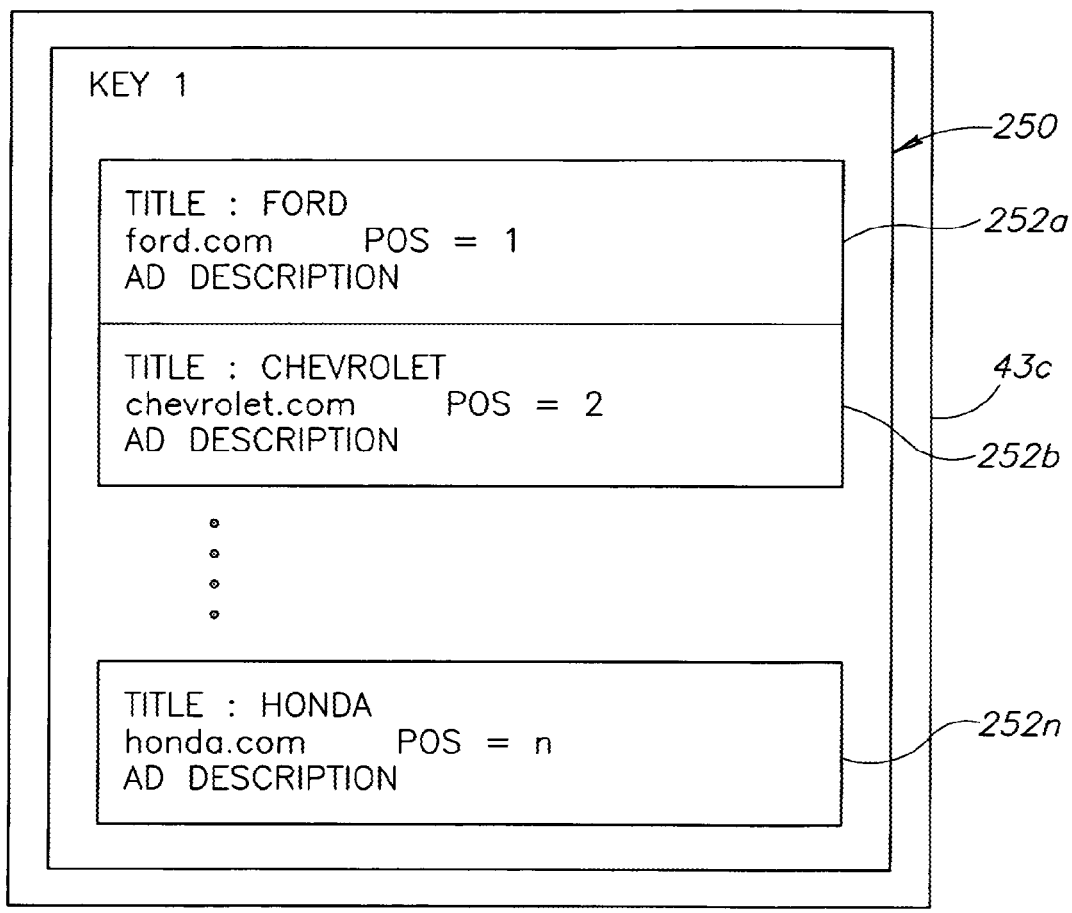
FIG. 7 is a diagram of a listing cache in accordance with an embodiment of the invention.

FIG. 7 shows an exemplary listing cache 43c, where a listing text 250 is stored therein. The listing text 250 includes a key, for example, KEY 1, formed of the unique identifier (ID), for example, user@abc.com, the keyword, for example, NEW CARS, and, the mailing identifier (ID), for example, 100001, as shown in FIG. 6 and detailed above, and N listings 252a-252n. Within each listing 252a-252n is, for example, a title for a web site associated with the listing (for example, in listing 252a, the title is FORD), a URL for the web site associated with the listing (for example, in listing 252a, the URL is www.ford.com), position data indicating the location in the template where the image with the link to the web site associated with the listing (for example, in listing 252a, the position data is, POS=1), and data for the body of the content to be returned is referenced as "AD DESCRIPTION". The AD DESCRIPTION is the text to be sent to the imaging server (IS) 38 with the TITLE, to be converted into the requisite image, for placement into the template of the opened e-mail at the requisite position. The listings 252a-252n are typically placed into the listing text in an order of priority, here, for example, top to bottom or 252a, 252b, to 252n. Additionally, by storing the listing text in the cache 43c with a unique key, a specific user will receive listings intended for him at the time he opened the e-mail.

Accordingly, processing of the first request will result in the delivery of the first listing 252a in the form of an image, to the template of the opened e-mail at a position determined by the position data in the first request (for example, at a first position as the position data is POS=1). Similarly, processing of the second request will result in the delivery of the second listing 252b in the form of an image, to the template of the opened e-mail at a position determined by the position data in the second request (for example, at a second position as the position data is POS=2). Processing of the requests until the last or Nth request, results in delivery of the nth listing 252n to the Nth position in the template of the opened e-mail mail, in accordance with the position data, POS=n (as detailed below).

Figure 8:
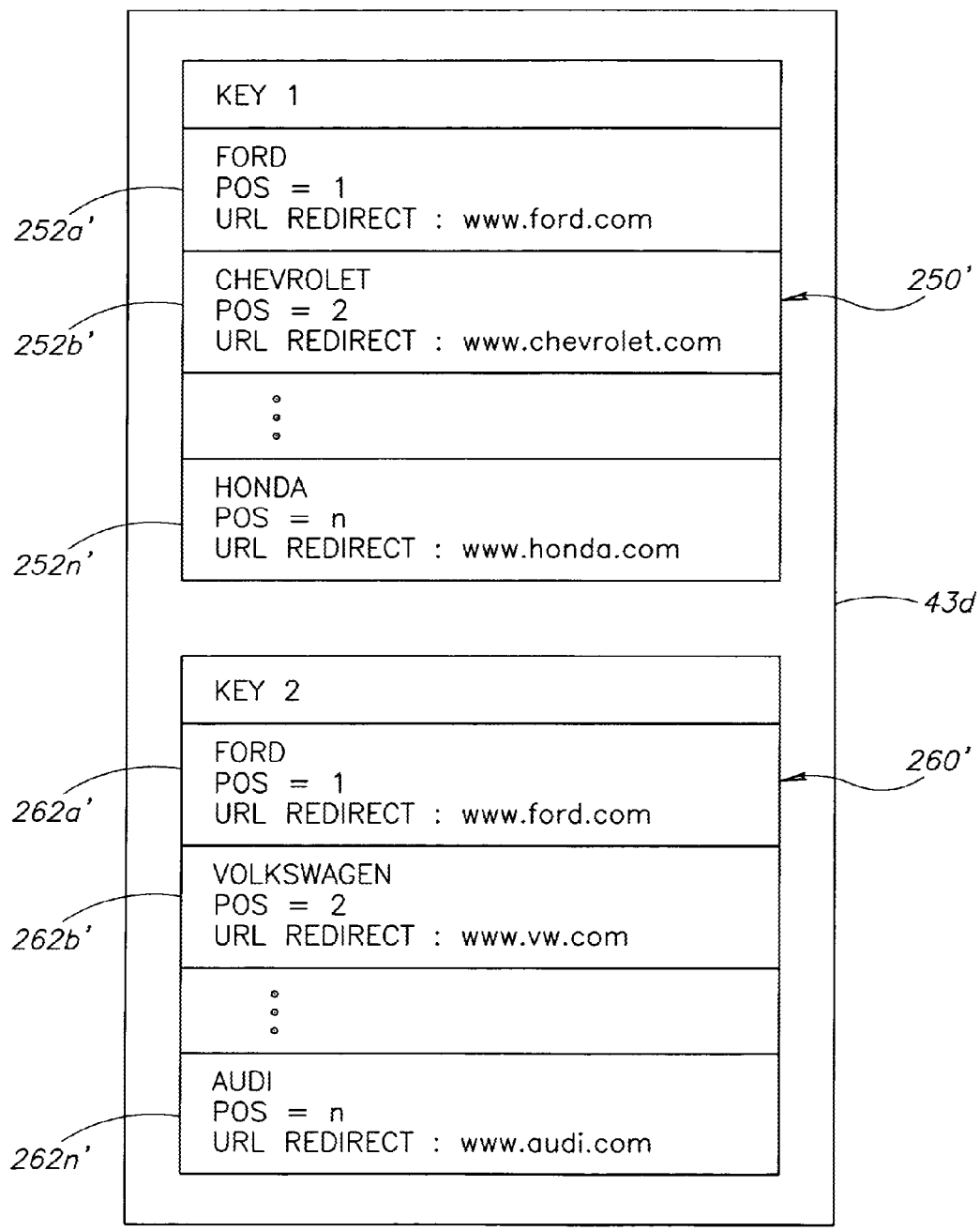
FIG. 8 is a diagram of a click cache in accordance with an embodiment of the invention.

Portions of the listing text are also stored in another cache, for example, a click cache 43d, at block 217. FIG. 8 shows an exemplary click cache 43d, where a listing text 250′, corresponding to the listing text 250 of the listing cache 43c, is stored in the click cache 43d. The listing text 250′ includes a key, identical to the corresponding key in the key cache 43a, as well as listings 252a′-252n′. Each listing 252a′-252n′ corresponds to the listings 252a-252n of the listing text 250. Within each listing 252a′-252n′ is, for example, a title for a web site associated with the listing (for example, FORD in the listing 252a′), a Redirect URL for the target web site associated with the listing (for example, www.ford.com, in the listing 252a′), and Position Data indicating the location for the resultant image produced from the listing in the template. For example, position data in the listing 252a′ is represented as POS=1.

Remaining in FIG. 8, there is also a second listing text 260′, to illustrate the click cache 43d, and the relationship of the caches 43a-43n. This second listing text 260′ corresponds to KEY 2 in the key cache 43a (FIG. 6) and includes listings 262a′-262n′ obtained at a different time than the listings corresponding to KEY 1, even though the keyword (e.g., NEW CARS) and mailing identifier (e.g., 100001) for both KEY 1 and KEY 2 are the same. The listings 262a′-262n′ result from the e-mail recipient joe@xyz.com opening his e-mail at a different time then the e-mail recipient user@abc.com, for different listings were provided at the time the Home Server (HS) 30 obtained the requisite content (for delivery to the respectively opened e-mails).

From block 216, the process moves to block 230, where the listing corresponding to the request number, and accordingly, the position data, is passed from the listing cache 43c of the Home Server (HS) 30 to the imaging server (IS) 38, over the Internet 24.

The imaging server (IS) 38 receives the listing in a text format and converts it into an image (or images). The image (or images) are sent to the user's e-mail client, via the Home Server (HS) 30, at block 232. The image(s) for the listing are rendered to the template in the position corresponding to the position data for the listing. The rendered image is typically paired with one or more links within the template, and, for example, at least one link within each image. The links are planted in the template in such a way that makes the image, or a portion thereof, clickable (activatable by a mouse click). The link includes an underlying URL for the Home Server (HS) 30 in a string with a unique identifier, keyword, mailing identifier and position data. An example string may be as follows: http://www.homeserver.com/"uniqueidentifier"&"keyword"&"mailingidentifier"&"positiondata"

The process then moves to block 110 of FIG. 2, to process the subsequent requests.

Turning back to block 204, if the received request is not the first request sent from the e-mail client, the process moves to block 220. The request is identified as a subsequent request, as the unique identifier and keyword from the subsequent sent back request define a key, that will match with a key in the key cache 43a. The now matched key in the key cache 43a, is then used to identify the corresponding listing in the listing cache 43c, and pull (retrieve) the requisite listing text corresponding to the particular request.

The process moves to block 222, where it is then determined if this request, from which the listing text was pulled from the listing cache 43c, is the last request of the total number of requests. This is accomplished by the following sub process.

Initially, in the e-mail sent to the e-mail client (the "sent e-mail"), the number of requests (N) in the e-mail, in particular the position data of the e-mail, has been stored in a cache, for example, the request cache 43b. The position data is associated with a key for each sent e-mail, as stored in the request cache 43b. The number of requests needing to be serviced for each sent e-mail corresponds to the number of listings returned from the requisite content server (CS) 34a-34n, for example the content server (CS) 34a. For the first request serviced, a reference counter in the Home Server (HS) 30 has been decremented by one (for example, N-1). For each subsequent request that is serviced, the reference counter is again decremented by one. Decrementing continues, until the reference counter reaches zero (for example, N=0), when the last request has been processed.

Accordingly, in block 222, if the request is not the last request, the reference counter has a value of greater than zero (for example, N>0). The process moves to block 230.

In block 230, the next listing of the listing text (in text form) corresponding to the specific request, is pulled from the listing cache 43c, and is passed from the Home Server (HS) 30 to the imaging server (IS) 38. The process then moves to block 232, as detailed above.

However, if at block 222, the request is the last request, the reference counter has been decremented to have a value of zero (N=0). The process moves to block 224. The listing text in the listing cache 43c is modified.

Modification typically occurs after the last request of the total number of requests (from block 104) has been received and processed. Modification of the listing cache 43c of listings therein typically involves deleting the listing text from the listing cache 43c.

This subprocess is typically timed, such that once the final listing from the listing cache 43c for this last request has been passed to the imaging server (IS) 38, from the Home Server (HS) 30, at block 230, the listing text is modified in the listing cache 43c. The modification typically includes deleting the listing text from the listing cache 43c in a time period, for example, approximately three hours from the time the first request of the total number of requests or N requests was processed.

With the process now at block 230, the final listing from the listing text is pulled from the listing cache 43c, in response to this last request, and is passed to the imaging server (IS) 38, as detailed above. Once the listing (in text form) has been passed to the imaging server (IS) 38, the process moves to block 232, and back to block 110 (FIG. 2), as detailed above. Since the last request (for example, the Nth request) has been processed, in FIG. 2, the process moves to block 112, where the entire content for the e-mail has now been rendered to the e-mail client of the user 40, for placement into the now-opened e-mail.

Figure 9A:
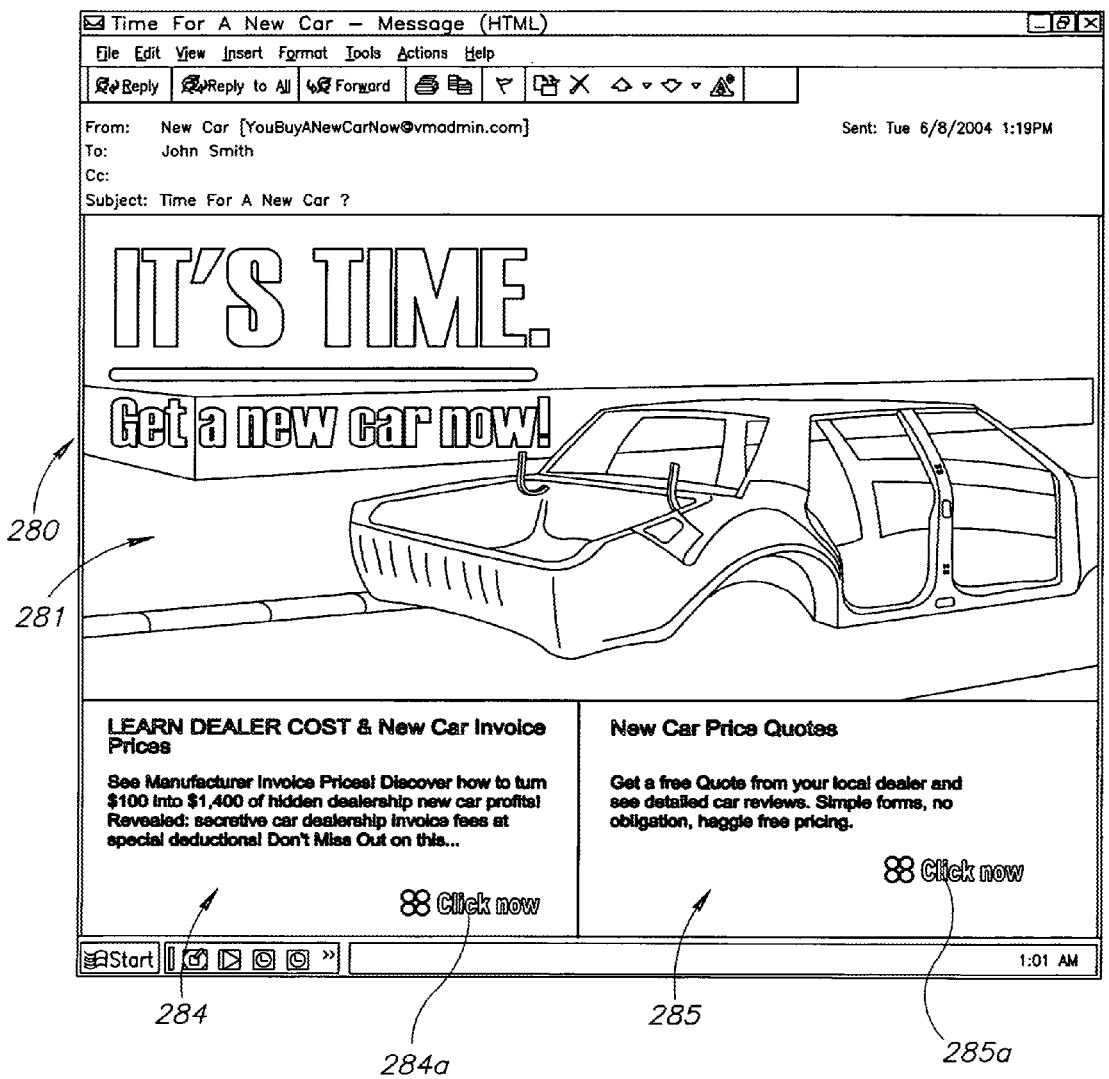
FIGS. 9A and 9B are screen shots of the text of e-mails received in accordance with the present invention.
Figure 9B:
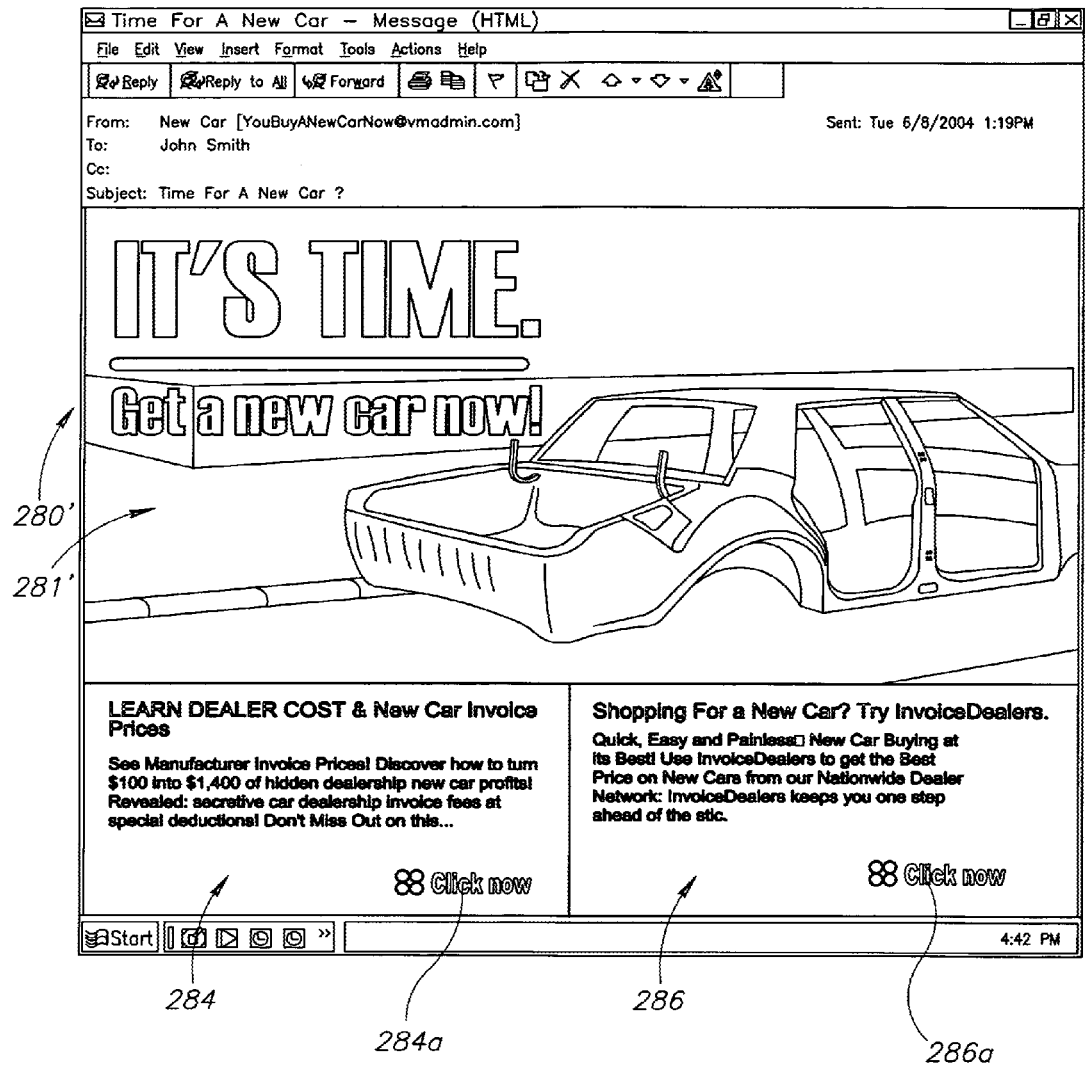

Attention is now directed to FIGS. 9A and 9B, that show screen shots of exemplary e-mails 280, 280′, opened at different times (a first time $t_1$ and a second time $t_2$), based on the example template 150 of FIG. 4. The e-mail 280 of FIG. 9A was opened at a first time ($t_1$), while the e-mail 280' was opened at a second time ($t_2$), subsequent to the first time ($t_1$).

The example e-mails 280, 280' are based on a sent e-mail with two requests (N=2), and therefore, the listing text returned from the requisite content server (CS) 34a-34n and stored in the listing and click caches, typically includes only two listings. In both e-mails 280, 280', the images 281, 281' for the section S1 151 of the template 150, includes an image of an advertisement. The images 281, 281' are static images, of a fixed content formed prior to the e-mail being sent. The images 284, 285 (in e-mail 280) and 284, 286 (in e-mail 280') for sections D1 161 and D2 162 of the template 150, were assembled when the e-mail was opened (in accordance with the processes detailed herein). These images 284, 285, 286, include portions 284a, 285a, 286a that cover links for the user to click on, and are indicated as such, for example, "Click now". (The portions 284a, 285a and 286a are hereafter referred to as links). These underlying links, when activated, typically by a mouse click, ultimately provide the browser of the user 40 with a redirect URL, directing the browser to a target web site (or web page). This web site (or web page) is from the listing that resulted in the image that supported the clicked link.

The links 284a, 285a, 286a include underlying strings. As detailed above, each string typically includes a URL for the Home Server (HS) 30 (www.homeserver.com) and data, typically in a string. The data typically includes a unique identifier, a keyword, a mailing identifier, and position data, with the unique identifier, keyword and mailing identifier being used to define a key (as detailed above). An example string, as detailed above, may be as follows:

http://www.homeserver.com/"uniqueidentifier"&"keyword"&"mailingidentifier"&"positiondata"

Activating the link, for example, by a mouse click, directs the user's browser to the Home Server (HS) 30. From the data in the string, a click cache 43d may be accessed. By accessing the click cache 43d, the browser receives a redirect URL for a web site (or web page) (that is targeted) corresponding to the image from the cached listing, as detailed below.

The resultant e-mail 280 opened at a first time ($t_1$), includes an image 281 of an advertisement, that is static, as the section S1 151 of the template 150 (FIG. 4). The images 284, 285, for sections D1 and D2 of the template 150, that were assembled when the e-mail was opened, include links 284a, 285a. These links 284a, 285a will redirect the user's web browser (browsing application) to the corresponding redirect URLs for the listings that resulted in the images, obtained at this first time ($t_1$).

Similarly, should the e-mail shown by the shaded line 60, be opened at a second time ($t_2$), a time subsequent to the first time ($t_1$), the resultant e-mail 280' would be such that the e-mail client would receive the static image 281 for the section S1 of the template 150 (FIG. 4). The images 284, 286, with links 284a, 286a, for sections D1 and D2 of the template 150, includes one similar image 284 and corresponding link 284a, and one different image 286, and corresponding link 286a, relevant to the time, $t_2$, as the image 285 and its link 285a (FIG. 9A) the first time ($t_1$) has expired. Both images 284, 286 were assembled once the e-mail was reopened at the second time $t_2$.

Figure 10:
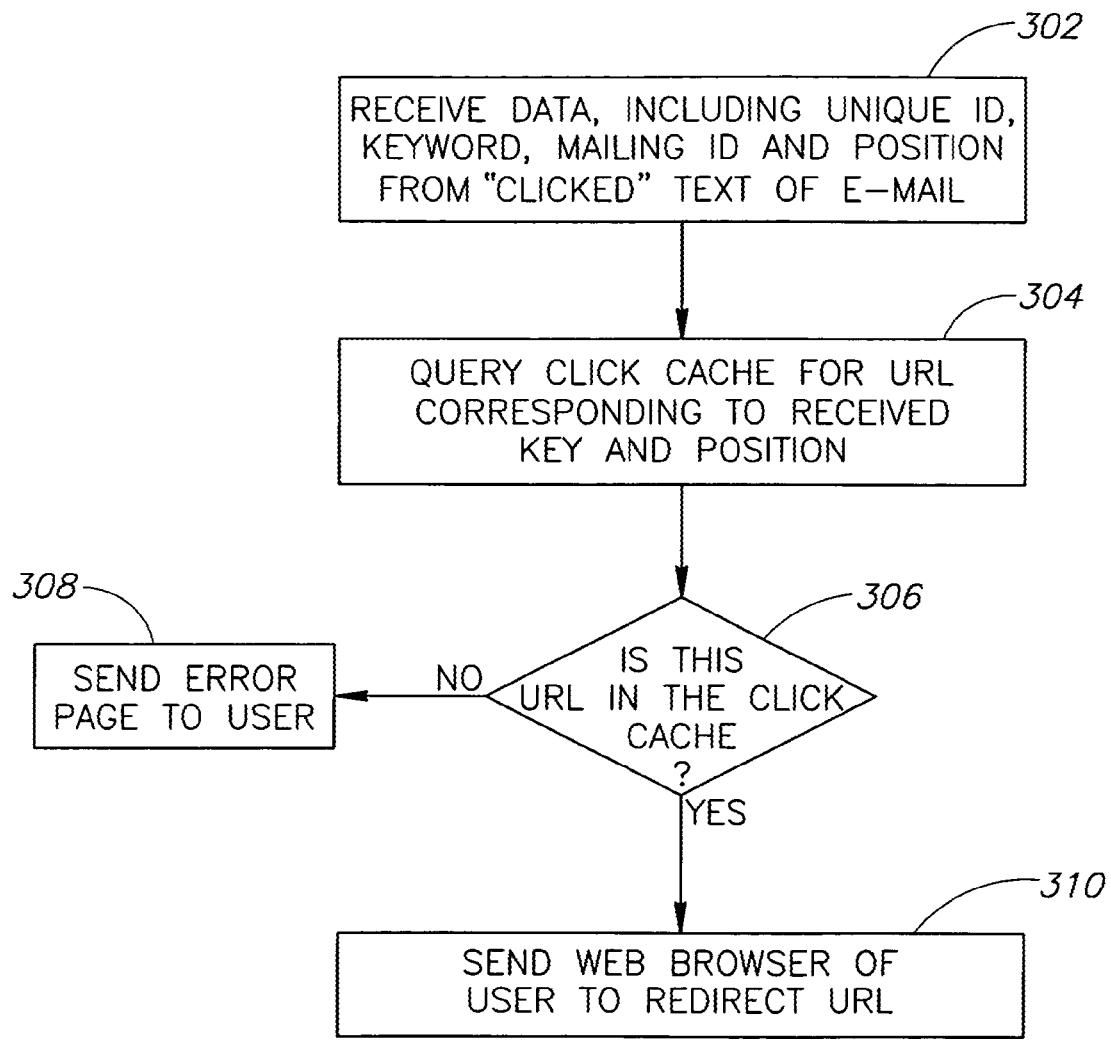
FIG. 10 is a flow diagram of a process for directing an e-mail recipient to an intended web site upon responding to an e-mail in accordance with an embodiment of the invention.

FIG. 10 shows a flow diagram of a process or method in accordance with another embodiment of the invention. This process may be a second phase of the larger process, where the user reaches the web site (or web page) (target web site or target web page) of provider of the time-relevant text.

Initially, the user, now having received the rendered images in the template for the now-opened e-mail, will "click" on an image 284, 285, 286 or portion thereof, that supports a link, such as the links 284a, 285a, 286a of FIGS. 9A and 9B, to which reference is now also made. Each link, as discussed above, is associated with a string, that includes the URL of the Home Server, and plus a unique identifier, keyword, mailing identifier and position data.

At block 302, the Home Server (HS) 30 receives a unique identifier, keyword, mailing identifier and position data (for the image location), typically in the above-described string, as a result of links 284a, 285a, 286a of the text 284, 285, 286 being clicked by the user 40 (activating their mouse 51, as shown in FIG. 1, at the desired link 284a, 285a, 286a). The Home Server (HS) 30 then creates a key from the unique identifier, the keyword, and the mailing identifier, and locates the matching key in the key cache 43a. With the matching key located, the corresponding key in the click cache 43d is located. The click cache 43d is queried for position data matching the position data of the string (of the link), in order to obtain a redirect URL for the particular position data, at block 304. It is then determined if the redirect URL is in the click cache, at block 306.

The redirect URL is a URL for the web site corresponding to the clicked text portion on the rendered e-mail, as programmed into the listed text in the click cache 43d. This URL is typically for a target web site or web page (content) on (or hosted by), for example, a third party server (TPS) 42a-42n.

Figure 11:
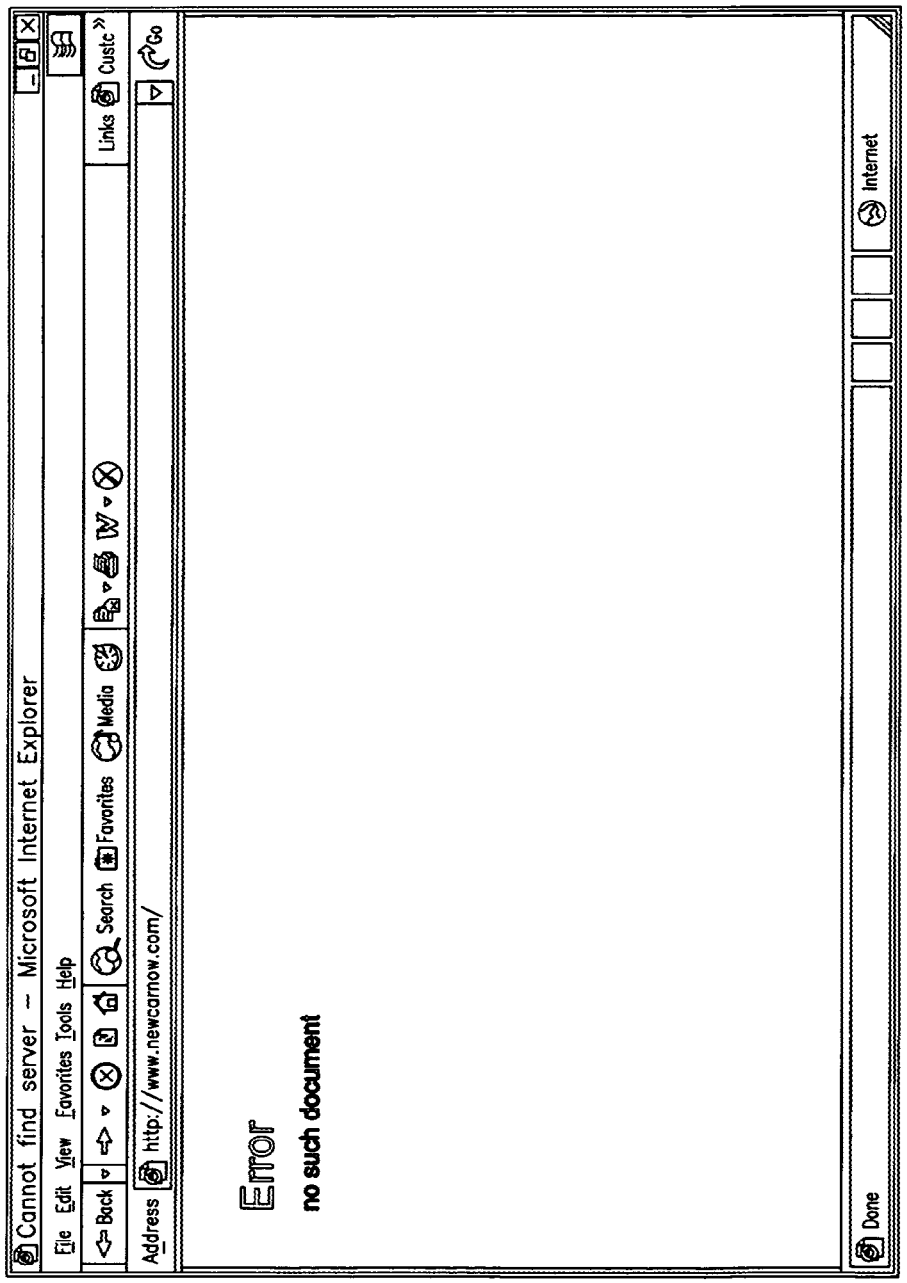
FIG. 11 is a screen shot showing an error or time out.

If the redirect URL is not in the click cache 43d, the user 40 is sent an error page, at block 308. This error page appears on the monitor 48 of the user 40 as, for example, the screen shot shown in FIG. 11.

However, if the redirect URL is in the click cache 43d (with the matching position data), the Home Server (HS) 30 sends the web browser of the user 40 the redirect URL at block 310. The user's web browser receives this redirect URL, and automatically accesses the web page (typically, a target web page) corresponding to the redirect URL.

Figure 12:
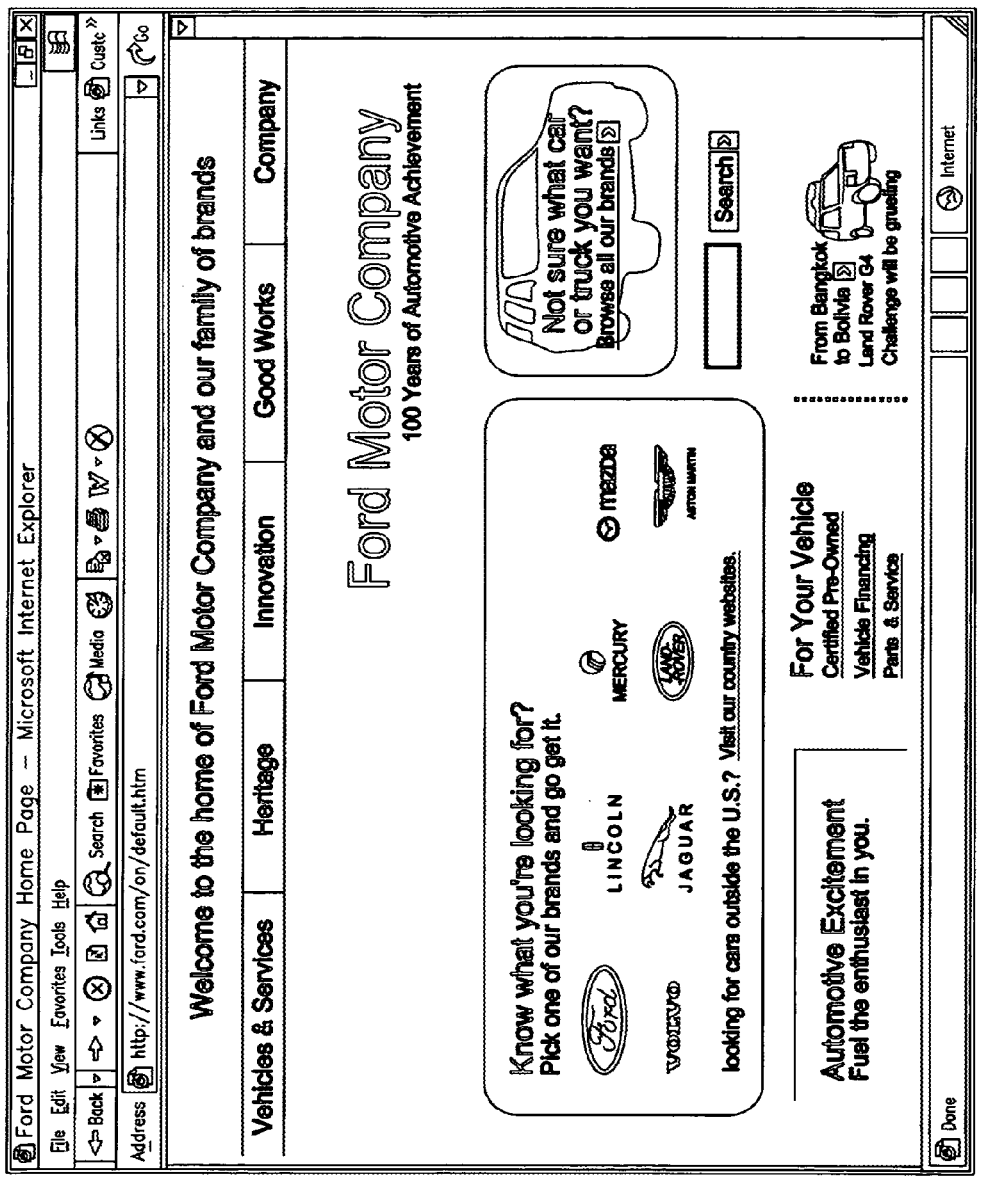
FIG. 12 is a screen shot showing a web page accessed from a redirect uniform resource locator in accordance with an embodiment of the invention.

For example, the redirect URL (from KEY 1, position data POS=1 in the example click cache 43d of FIG. 8) may be "www.ford.com." In this case, the user's web browser would be directed to www.ford.com, whereby the web page, obtained at the address www.ford.com, shown in FIG. 12, would appear on the monitor 48 of the user. The server that hosts the site associated with www.ford.com may be any one or more of the third party servers (TPS) 42a-42n.

The click cache 43d is typically designed to expire in a time period that is less than the limit redirect timeouts (described for block 224 above). This time may be, for example, approximately two hours.

Figure 13:
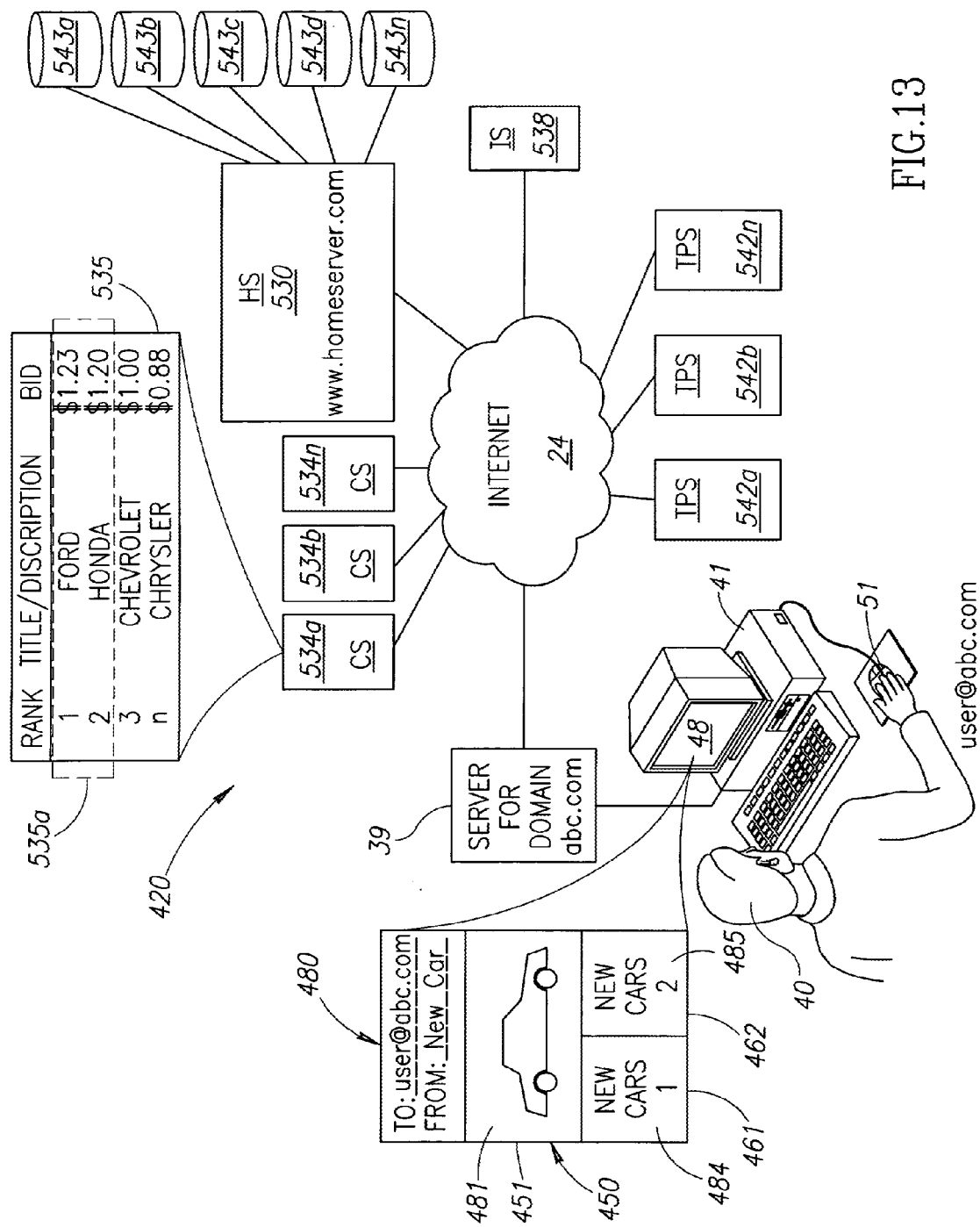
FIG. 13 is a diagram of Pay Per Click content being delivered to a user in accordance with an embodiment of the present invention.

Attention is now directed to FIG. 13, that shows an exemplary system 420 in an exemplary operation, as Pay Per Click (PPC) advertising content is provided to the e-mail that is sent to and opened by the user 40. The process is in accordance with the processes shown in FIGS. 2, 5 and 10, and described above, with portions unique to PPC-content delivery specifically discussed herein.

In FIG. 13, the components of the system 420 are similar to those components in the system 20 of FIG. 1, that have been described above, and have been incremented by "500".

Differences between the systems 20 and 420 are noted below.

Initially, the Home Server (HS) 30 sends the e-mail client of the computer 41 of the user 40 an e-mail (the "sent e-mail"). The opened e-mail 480 includes a template 450, with a section 451, that supports a static image 481, and two sections 461, 462, defining first and second positions, for dynamically generated images 484 (NEW CARS 1), 485 (NEW CARS 2). As two positions are shown for the dynamically generated (and rendered) images, two requests are sent back, whereby the max number N is 2.

The sent back request (from the e-mail client to the Home Server (HS) 530) includes the unique identifier, user@abc.com, the keyword "NEW CARS", position data and a max number "N". The max number in this example is 2, representing two requests, corresponding to the two images 484, 485, whose content is assembled and provided once the e-mail is opened.

Processing of these two requests is in accordance with the flow diagram of FIGS. 2 and 5, as detailed above. However, at block 210, the keyword "NEW CARS" is isolated from the request, which results in the content server (for example content server 534a) creating a list 535 for PPC advertising.

The content server produces the list 535 by ranking the content providers in a priority order for a given time, in accordance to the amount each will pay (their bid) when their link in the dynamically rendered text is clicked. For example, in the list 535 at the time it was created, FORD is ranked in the first position, with top priority, as it pays $1.23 per user click to the Home Server (HS) 530 operator. HONDA is ranked in the second position, with second priority, as it pays $1.20 per click. CHEVEROLET is ranked in the third position, with third priority, as it pays $1.00 per click, while CHRYSLER is ranked in the nth position, with nth priority, as it pays $0.88 per click.

The list 535, or portions thereof, once returned to the Home Server (HS) 530, is converted into a listing text with individual listings and cached in the requisite caches, for example, key cache 543a, request cache 543b, listing cache 543c, and click cache 543d, similar to that detailed above.

For example, as shown in FIG. 13, the retrieved list 535a (shown as a broken line block) includes only two listings (for example, the top two for FORD and HONDA, respectively), as there are only two template sections 461, 462 to accommodate the retrieved (defining first and second positions) and dynamically generated images, rendered to the opened e-mail 480. Subsequently, the cached listing text includes only two listings (in the listing 543c and click 543d caches). Accordingly, the opened e-mail will include an image 484 with an implanted link to the Home Server (HS) 530, that will result in the user's browser receiving the redirect URL for FORD (www.ford.com), and an image 485 with an implanted link to the Home Server (HS) 530 that will result in the user's browser receiving the redirect URL for HONDA (www.honda.com).

When the user clicks on the portion of the text with the link, the process of FIG. 10 begins, resulting in the user's browser being redirected to a redirect URL corresponding to the clicked text. For example, should the portion over the link in the image 484 at the first position be clicked, the user's browser will be redirected to the redirect URL for FORD, www.ford.com. This web page for www.ford.com may be provided at the third party server (TPS) 542a. Similarly, should the text portion over the link in the second image 485 at the second position be clicked, the user's browser will be redirected to the redirect URL for HONDA, www.honda.com. This web page for www.honda.com may be provided at the third party server (TPS) 542b.

The above-described processes including portions thereof can be performed by software, hardware and combinations thereof. These processes and portions thereof can be performed by computers, computer-type devices, workstations, processors, micro-processors, other electronic searching tools and memory and other storage-type devices associated therewith. The processes and portions thereof can also be embodied in programmable storage devices, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

While preferred embodiments of the present invention have been described, so as to enable one of skill in the art to practice the present invention, the preceding description is intended to be exemplary only. It should not be used to limit the scope of the invention, which should be determined by reference to the following claims.

What is claimed is:

1. A server-implemented method for rendering an electronic mail (e-mail) message to a user of a terminal, the method comprising the steps of:
    (a) transmitting, from at least one first server, the e-mail message to the terminal, the e-mail message comprising a content request, such that, when the user opens the e-mail message, the terminal automatically transmits the content request to the at least one first server;
    (b) receiving, at the at least one first server, the content request;
    (c) retrieving, by the at least one first server, a set of content based on the content request;
    (d) converting, by at least one second server, the set of content into at least one image associated with the set of content;
    (e) transmitting, from the at least one first server, the at least one image associated with the set of content to the terminal, such that the terminal automatically includes the at least one image associated with the set of content in the rendering of the e-mail message to the user at the terminal; and,
    (f) the set of content is time-dependent, such that: i) when the user opens the e-mail message at a first time, the at least one first server, in response to receiving a first instance of the content request from the terminal, retrieves a first set of content to be automatically included as at least one image by the terminal in a first rendering of the e-mail message to the user; and, ii) when the user opens the e-mail message at a second time different from the first time, the at least one first server, in response to receiving a second instance of the content request from the terminal, retrieves a second set of content, different from the first set of content, to be automatically included as at least one image by the terminal in a second rendering of the e-mail message to the user.

2. The method of claim 1, wherein:
    the e-mail message comprises two or more content requests, such that, when the user opens the e-mail message, the terminal automatically transmits the two or more content requests to the at least one first server; and
    step (b) comprises receiving, at the at least one first server, the two or more content requests;

step (c) comprises retrieving, by the at least one first server, two or more sets of content based on the two or more content requests;

step (d) comprises converting, by the at least one second server, the two or more sets of content each into at least one image associated with each set of content; and step (e) comprises transmitting, from the at least one first server, the at least one image associated with each of the two or more sets of content to the terminal, such that the terminal automatically includes each of the at least one image associated with each of the two or more sets of content in the rendering of the e-mail message to the user.

3. The method of claim 2, wherein each of the at least one image associated with each of the two or more sets of content includes location information, such that upon bring transmitted, each of the at least one image associated with each of the two or more sets of content are rendered in different locations in the body of the opened e-mail message.

4. The method of claim 1, wherein the at least one image associated with the set of content includes a link to be presented by the terminal in the rendering of the e-mail message to the user, such that, when the link is selected by the user, the terminal accesses a website associated with the link.

5. The method of claim 1, wherein:

in addition to the content request, the e-mail message comprises static content; and the terminal renders (i) a first portion of the e-mail message based on the static content and (ii) a second portion of the e-mail message based on the at least one image associated with the set of content received from the at least one first server.

6. The method of claim 5, wherein the e-mail message comprises location information that enables the terminal to determine where to place the at least one image in the body of the opened e-mail relative to placement of the static content upon rendering of the at least one image to the e-mail message.

7. A terminal-implemented method for rendering an electronic mail (e-mail) message to a user of the terminal, the method comprising the steps of:

(a) receiving, at the terminal, the e-mail message transmitted from at least one first server, the e-mail message comprising a content request;

(b) receiving, at the terminal, an indication that the e-mail message has been opened by the user;

(c) automatically retrieving, by the terminal, the content request from the e-mail message;

(d) automatically transmitting, from the terminal, the content request to the at least one first server, such that the at least one first server retrieves a set of content based on the content request and transmits to the terminal at least one image associated with the set of content, the at least one image created by an imaging server converting the set of content based on the content request, into the at least one image;

(e) receiving, at the terminal, the at least one image associated with the set of content transmitted from the at least one first server;

(f) automatically rendering, by the terminal, the at least one image associated with the set of content into the opened e-mail, and, (g) the set of content is time-dependent, such that i) when the e-mail message is opened by the user at a first time, the at least one first server, in response to receiving a first instance of the content request from the terminal, retrieves a first set of content to be automatically included as at least one image by the terminal in a first rendering of the e-mail message to the user; and, ii) when the e-mail message is opened by the user at a second time different from the first time, the at least one first server, in response to receiving a second instance of the content request from the terminal, retrieves a second set of content, different from the first set of content, to be automatically included as at least one image by the terminal in a second rendering of the e-mail message to the user.

8. The method of claim 7, wherein:

the e-mail message comprises two or more content requests;

step (c) comprises automatically retrieving, by the terminal, the two or more content requests from the email message;

step (d) comprises automatically transmitting, from the terminal, the two or more content requests to the at least one first server, such that the at least one first server retrieves two or more sets of content based on the two or more content requests;

step (e) comprises receiving, at the terminal, the at least one image associated with each of the two or more sets of content, transmitted from the at least one server; and step (f) comprises automatically including, by the terminal, the at least one image associated with each of the two or more sets of content in the rendering of the email message to the user.

9. The method of claim 7, wherein the at least one image includes a link to be presented by the terminal in the rendering of the e-mail message to the user, such that, when the link is selected by the user, the terminal accesses a website associated with the link.

10. The method of claim 7, wherein:

in addition to the content request, the e-mail message comprises static content; and the terminal renders (i) a first portion of the e-mail message based on the static content and (ii) a second portion of the e-mail message based on the at least one image associated with the set of content received from the at least one first server.

11. The method of claim 10, wherein the e-mail message comprises location information that enables the terminal to determine where to place the at least one image in the rendering of the e-mail message relative to placement of the static content.

12. The method of claim 2, wherein the at least one first server includes a main server.

13. The method of claim 2, wherein the at least one second server includes an imaging server.

14. A system for rendering an electronic mail (e-mail) message to a user of a terminal linked to a communications network, over a communications network, the system comprising:

at least one first server linked to the communications network, the at least one first server comprising:

a non-transitory storage medium for storing computer components; and a processor in communication with the storage medium for executing the computer components, the computer components comprising:

an e-mail component for transmitting at least one e-mail message to the terminal, the e-mail message comprising a content request, such that, when the user opens the at least one email message, the terminal automatically transmits the content request to the at least one first server;

a receiver component for receiving the content request;

a retrieval component for retrieving a set of content, which is time-dependent, such that upon receiving a first instance of the content request and a second instance of the content request resulting from the opening of the at least one e-mail message by the user at different times, different sets of content are retrieved, each of the different sets of content corresponding to the different times of each opening of the at least one e-mail message by the user; and, a transmission component for transmitting a different at least one image associated with each different retrieved set of content to the terminal, such that the terminal automatically includes each at least one image associated with each retrieved set of content in the rendering of each opening of the at least one e-mail message to the user at the terminal; and, at least one second server linked to the communications network and configured for converting each retrieved set of content from the retrieval component into each at least one image.

* * * * *